United States Patent [19]

Mehnert

[11] 4,449,191
[45] May 15, 1984

[54] PROCESS AND AN APPARATUS FOR MEASURING AN ANGLE

[76] Inventor: Walter Mehnert, Grillparzerstr. 6, D-8012 Ottobrunn, Fed. Rep. of Germany

[21] Appl. No.: 256,031

[22] Filed: Apr. 21, 1981

[30] Foreign Application Priority Data

May 14, 1980 [DE] Fed. Rep. of Germany ....... 3018496

[51] Int. Cl.³ .......................... G06F 15/20; G01B 7/30
[52] U.S. Cl. .................................... 364/559; 364/565; 33/1 PT; 250/231 SE
[58] Field of Search ............... 364/559, 565, 556, 560; 33/1 N, 1 PT; 250/231 SE; 340/347 P

[56] References Cited

U.S. PATENT DOCUMENTS

| | | | |
|---|---|---|---|
| 3,945,128 | 3/1976 | Weiss | 33/366 |
| 4,064,504 | 12/1977 | Lepetit et al. | 250/231 SE X |
| 4,094,073 | 6/1978 | Parra | 364/559 X |
| 4,162,399 | 7/1979 | Hudson | 250/231 SE |
| 4,181,962 | 1/1980 | West, Jr. et al. | 364/565 |
| 4,240,069 | 12/1980 | Hullein et al. | 250/231 SE X |
| 4,245,322 | 1/1981 | Batchelor | 364/565 |
| 4,318,225 | 3/1982 | Jenkinson | 33/1 PT |
| 4,323,976 | 4/1982 | Radaelli et al. | 364/565 |
| 4,342,025 | 7/1982 | Spalti et al. | 250/231 SE X |

*Primary Examiner*—Edward J. Wise

[57] ABSTRACT

The angle which two members enclose with respect to an axis of rotation about which they are rotatable with respect to each other is measured by placing a rotating mark carrier on one of two members. The carrier has marks disposed thereon at a certain distance apart in the direction of rotation. A first sensor is attached to the same member as the mark carrier and a second sensor is attached to the other member. The sensors emit a signal corresponding to each of the passing marks, which signal is fed to a measuring and evaluating circuit. The circuit has an identification circuit which identifies the marks belonging to the signals emitted by the sensors, a time measuring unit which measures the time distances of the signals emitted by the sensors and a calculation and storage circuit which, after receiving a corresponding command signal, calculates and stores the angular distances, with respect to a zero point of the angular measurements. The measurement is taken between the marks from the time distance values for signals assigned to identified marks and coming from the various sensors; from stored calibrating values for the absolute angular distances of identified marks; and from the instantaneous angular velocity of the mark carrier; said calculation and storage circuit, upon subsequent rotations of the mark carrier, calculates the instantaneous angle between the two members from the time distance values for signals assigned to identified marks and coming from the various sensors, and from the stored angular distances of these marks, the angular distances being with respect to the zero point of the angular measurement, and from the instantaneous angular velocity of the mark carrier.

46 Claims, 8 Drawing Figures

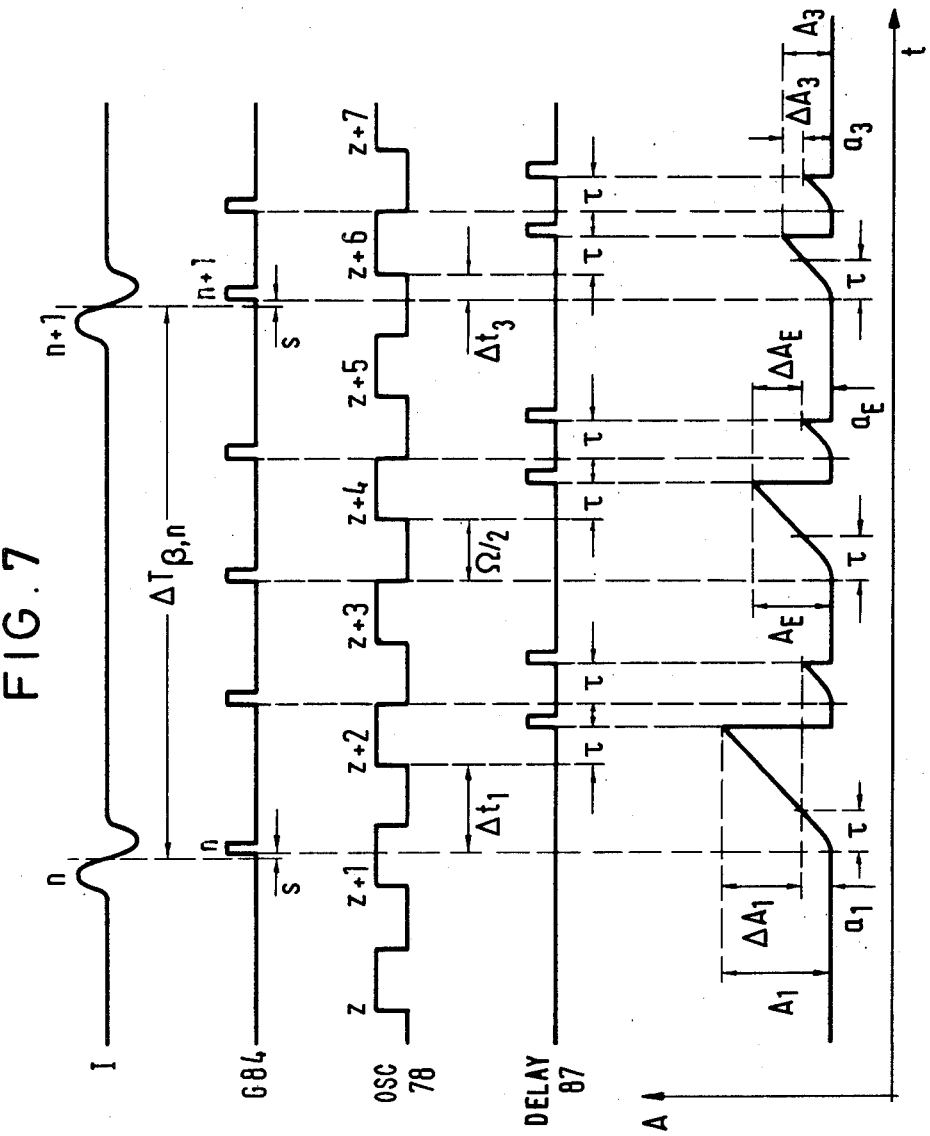

PROCESS AND AN APPARATUS FOR MEASURING AN ANGLE

BACKGROUND OF THE INVENTION

This invention concerns a process and an apparatus for measuring angular positions, and, more particularly, to apparatus employing moving discs perpendicular to a common axis.

The angle enclosed by the two members which are rotatable with respect to each other about their axis of rotation must first be clearly defined. It is assumed that in each case in which such an angle is to be measured, two radial rays can be determined which extend from their mutual axis of rotation and which are rigidly connected to their respective members. The relative angular position of these rays is to be continuously monitored and measured. Depending on the kind of process used for measuring the angle, or depending on the angle measuring apparatus, these two radial rays can then be unambiguously determined by the positioning of sensors or reference marks.

DESCRIPTION OF THE PRIOR ART

Known methods of the type described (e.g. German published application No. 2,501,373; German published application No. 2,649,898; German laid-open application No. 2,237,138) all have in common that a mark carrier, which is embodied as a flat circular disc, is rigidly connected to one of the two members such that the mutual axis of rotation runs through the midpoint of the disc rotating with the member, while a sensor, which senses this mark carrier, is rigidly connected to the other member. In these constructions, one of the two above-mentioned radial rays is, by way of example, defined by a "zero mark" disposed on the mark carrier and differing from the other marks by way of a particular shape, while the second radial ray is determined by the sensor scanning the mark.

In order to be able to measure with high resolution the angle enclosed by these two radial rays with respect to the axis of rotation, a plurality of marks spaced apart in the direction of rotation and in the form of radially extending stripes are disposed, in addition to the zero mark, on the disc constituting the mark carrier. These stripes have, by way of example, a different light transmitting capacity from the portions of the mark disc surrounding them, so that the sensor comprising an opto-electric sensor always emits an electric signal when the brightness of a beam of light, which is emitted by a light source arranged on the other side of the disc, is varied by the passing of such a mark. Thus, if one of the two members is turned with respect to the other, a sequence of pulse-shaped electric signals is produced, and the evaluation of these signals gives information concerning the angular position of the two members with respect to each other after completion of the rotative movement.

The measuring accuracy of these known methods is determined in particular by the precision with which the scale marks are disposed on the mark carrier, in which case the general term "precision" covers the following important individual factors: The individual scale marks must be as narrow as possible in the direction of rotation and must have edges which are as parallel to one another as possible; moreover, they must extend radially as accurately as possible and must be as identical as possible. Furthermore, the angular distances of the marks, i.e. the angle enclosed by the marks with respect to the axis of rotation, must correspond to each other with high accuracy. It is not merely sufficient for the mark carrier, used in the known methods, to have these properties only at, or immediately after its manufacture, but also such properties must endure during extended use, very high requirements are made on the continued measuring accuracy and particularly on the temperature stability of the material used for manufacturing such a mark carrier.

Therefore, the state of the art generally uses special glass discs as mark carriers in which the necessary number of marks is engraved or etched in the form of highly accurately positioned and extremely narrow marks, being thus very expensive. It is typical for the width of the mark to be approximately equal to the distance between the marks, thus being generally in the magnitude of approximately $10\mu$. From this results the further problem wherein a very unfavourable signal-noise ratio is produced. Considerable electronic-circuit expenditure is necessary to extract the wanted signals assigned to the individual marks from the very noisy sensor output signals in order to process them further. Further, the maximum obtainable measuring accuracy is negatively affected by this poor signal-to-noise ratio.

The high manufacturing costs resulting from the abovementioned problems both in the case of the production of the mark carrier and from the production of the electronic evaluating circuit have the result that highly accurate measurement with a high degree of resolution was only possible in cases in which the use of such an expensive measuring device was justifiable from an economic point of view.

SUMMARY OF THE INVENTION

It is therefore the object of the invention to provide a process and an apparatus of the type mentioned above which enables highly accurate and, if desired, highly resolved angular measurement while using a simple mark carrier which is inexpensive to manufacture.

This object is solved by the invention embodying features as will now be described.

The basis of the invention process lies in a system in which a constantly rotating mark carrier, which may be driven for instance by a small electric motor or indirectly via gears or the like, is attached to one of the two members such that the axis of rotation of the mark carrier coincides as accurately as possible with the mutual axis of rotation of the two members. A plurality of marks are arranged on the mark carrier such that these marks are fairly evenly distributed over the paths which are to be swept by two sensors during rotation of the mark carrier. One of the marks is established as the zero mark by differentiation in length and/or width and/or distance to a neighbouring mark from the remaining marks. One of the sensors is rigidly attached to one and the same member as the mark carrier and the other is attached to the other member. The marks are fairly evenly distributed without having to go to particular expense as regards their highly accurate angular positioning. Nevertheless, the respective instantaneous angular position of these two members, which is here defined by the radial rays extending from the mutual axis of rotation and through respective ones of the two sensors, can be highly accurately determined in that the time interval between signals of one sensor and signals of the other sensor are measured, in which case these sensor signals correspond respectively to identified marks.

By way of example, if it is assumed that a signal is produced by the m-th mark at any given time $t_1$ at one sensor, and that shortly afterwards a signal appears at the other sensor which belongs to the n-th mark, then from the time interval $\Delta\theta_{mn}$ ($t_1$) of these two signals from the instantaneous angular velocity $\omega(t_1)$, which is here first of all simply assumed to be known, and from the angular distance between the m-th mark and the n-th mark $\psi_{mn}$, which is also known, for the instantaneous angle $\phi(t_1)$ of the two members a first value can be calculated in accordance with the following equation:

$$\phi(t_1) = \Delta\theta_{mn}(t_1)\omega(t_1) - \psi_{mn} \quad (1a)$$

Since each sensor sweeps over a multiple of marks, a plurality of further angular measurements can be determined by measuring the time intervals between further marks, e.g. between the marks m+1 and n+1, m+2 and n+2, etc. in accordance with the analog equations:

$$\phi(t_2) = \Delta\theta_{m+1, n+1}(t_2)\omega(t_2) - \psi_{m+1, n+1} \quad (1b)$$

$$\phi(t_3) = \Delta\theta_{m+2, n+2}(t_3)\omega(t_3) - \psi_{m+2, n+2} \quad (1c)$$

$$\phi(t_r) = \Delta\theta_{\mu,\nu}(t_r)\omega(t_r) - \psi_{\mu,\nu} \quad (1)$$

in which case the angular measurements $\phi(t_r)$ must coincide if the two members have not moved towards each other in the respective period of time.

In contrast to the known method, in which the individual marks are not treated individually but completely anonymously and therefore have to be disposed on the mark carrier as accurately as possible and in exactly defined angular distances, the invention first of all employs a mark carrier manufactured at low cost wherein the angular distances of the marks may vary within relatively wide limits, and secondly accuracy is achieved in that the angular distances of the marks of interest are exactly determined before the actual angular measurement. The angular distances are stored while being assigned to the marks treated individually, and then, when these marks (which were identified as individual marks during the angular measurement procedure) have been used for the time measurements mentioned above, the respectively corresponding stored angular distance value is referred to in order to calculate in accordance with the above equations the instantaneous angle between the two members.

The invention comprises a time measuring unit for measuring the time elapsed between progressive marks, a storage unit for storing values of the time measurements, and a comparison circuit for comparing recent and past values of the time measurements. A calculating unit calculates the speed of rotation from the time measurements. A mark identification circuit permits identification of the start of a sequence of marks. This data is then utilized in a further calculator to solve the foregoing equations to give the desired angle.

DESCRIPTION OF THE INVENTION AND ITS OPERATION INCLUDING MARK IDENTIFICATION AND INTERVAL MEASUREMENT

Before dealing with the identification of the individual marks, which plays an important part in this context, it is pointed out that the inventive method can be carried out independent of whether the two sensing devices on the mark carrier sense the same marks or two groups of marks which are spaced apart from each other. In accordance with the invention, the second of these cases is, however, preferred since in the first case the difficulty arises that the relative paths of motion of the two sensing devices are very close together so that it is possible that substantial problems as to space arise, especially if angles are to be measured which are larger than 360°. Although when using two separated groups of marks it is necessary to take into account the angle between the two groups as well as the angular distances of the individual marks within each group, this only appears to be a disadvantage in comparison to the use of only one mark group.

If one wishes to avoid a troublesome adjustment arrangement, which can hardly be maintained over long periods, then, even if the two sensing devices sense one and the same mark group, the two tracks on which this is carried out will not be identical to each other, but, for example, the track of one sensing device will have a somewhat smaller radius with respect to the axis of rotation than the track of the other sensing device. Since in accordance with the invention, mark carriers are used, in which case the marks, e.g. longitudinal, radially aligned stripes, are disposed thereon without going to any great technical expenditure, it must be assumed that these marks will not only vary with respect to their angular distances but also that they will not extend exactly radially. Hence, in this case the mark carrier will in each case assume a somewhat different angular position when one and the same mark produces a signal at the sensor of one sensing device or at the sensor of the other sensing device. Hence, in this case, too, the signals produced at one sensor, on the one hand, must be correlated, with respect to the angle, with the signals produced at the other sensor, on the other hand, so that in the end the same situation results as when two spaced groups of marks are used. Therefore, reference has been made to the conditions of the preferred case wherein each sensor senses a group of marks, which is geometrically separated from the other group of marks, sensed by the other sensor.

As explained in detail above, it is a fundamental aspect of the inventive process that the marks assigned to sensor signals referred to for time interval measurements are treated and identified as individual marks both in the case of marks of the one and marks of the other group. Preferably, the individual marks within the respective group are identified by means of asymmetries present in this mark group.

By way of example, these asymmetries may be such that the individual marks differ from one another with respect to their length and/or width or differ by some other coding, such that they are identifiable in each case as individual marks. However, the expenditure necessary for coding when manufacturing the mark carrier and for de-coding by means of corresponding sensing devices, when actually measuring the angle, is extremely high.

It is therefore preferred that only one mark of each mark group be identified by means of asymmetries, and this mark then serves as zero mark when identifying the remaining marks of this group by counting the corresponding sensor signals. In this case, the necessary decoding expenditure is substantially lower since it is, for example, sufficient to embody the zero mark of each group either somewhat longer or shorter than the other marks, which are substantially similar to one another, and to sense this difference by means of a corresponding sensor.

In accordance with a particularly preferred embodiment of the inventive process, the expenditure necessary for this can be reduced in that for each of the mark groups the time intervals of all sensor signals, following one another during at least one rotation, are measured and that the angular distances of the marks, which are thus determined and which are not exactly alike, are evaluated as asymmetries.

Thus, the asymmetries necessary for identifying the individual marks result quite automatically so that it is always possible by means of an appropriately exact time measuring process to determine the angular distances between the marks. In particular the angular distance between marks immediately following one another can be determined, with such high accuracy that, even within the respective mark group, no two measuring results will exist which will correspond with each other for a given angular speed, if the mark carrier is manufactured with much greater precision than is intended and necessary in the inventive process, with respect to the positioning of the individual marks.

Hence it is possible to identify as individual marks each mark within a group by means of its angular distance from the immediately preceding mark and/or immediately following mark, or even by means of the angular distances from two or more preceding marks, when all angular distances of all marks of this group, which follow one another immediately in the direction of rotation, are measured and stored.

If, for example, a certain function is to be triggered when the n-th mark of one group passes the corresponding sensor, this triggering can then be carried out when the first sensor signal occurs, after the reappearance of the angular distance between the (n−1)-th and the (n−2)-th mark, which is known and which only exists once in this mark group, has been identified.

Since in the case of the inventive process, the angular distance between two marks is measured via the time interval of the corresponding sensor signals and since the instantaneous angular velocity of the mark carrier is included in this measurement, it is advisable to refer, for example, to the quotient of the time intervals indicative of the angular distances of the (n−1)-th to the (n−2)-th and the (n−2)-th to the (n−3)-th mark to identify the n-th mark, since the instantaneous angular velocity is dropped when forming this quotient if the rotational or angular velocity of the mark carrier is constant during the period comprising these two time intervals immediately following each other; this condition will generally be fulfilled due to the shortness of this period. Moreover, the probability that different mark sequences, for which the quotients formed in the manner described have values equal to one another within the scope of the highly accurate time measurement used, will be present on a mark carrier within one mark group is again substantially smaller than the probability that two exactly similar angular distances between subsequent marks will happen to turn up.

It is not necessary in the case of the particularly preferred identification process described to identify all marks individually. Instead, it is sufficient to identify one single mark in each mark group by means of asymmetries present, and this mark then serves as zero mark in the subsequent identification of the remaining marks by counting the corresponding sensor signals.

It is stressed that in the most general case it is not necessary to determine a priori and finally these zero marks when manufacturing the mark carrier. Instead, any one of the marks present on the mark carrier can be picked out at random during the operation of a measuring device operating in accordance with the inventive method, and this can be used as zero mark for a subsequent period.

The choice of any one mark as zero mark is preferably carried out by means of the specification that the counter, which serves for periodic counting of the marks, i.e. counting which starts from the beginning with every new rotation, is always set back to zero by the mark which is the last one of three immediately subsequent marks, the two time intervals of which produce the smallest or, alternatively, the largest quotient.

To simplify matters, it is, however, also possible to use "intended" asymmetries instead of or in addition to the "natural" asymmetries present in the mark groups for identifying at least the zero mark. Thus, for example, provision can be made that one of the marks is determined as zero mark in that its angular distance to one of its immediately adjacent marks is substantially different from the angular distances of all other marks immediately adjacent to one another.

As the foregoing equations (1) show, it is not only necessary, in order to determine the instantaneous angle $\phi(t)$ in accordance with the invention, to identify the marks $\mu$ and $\nu$ as such, although these are referred to for the measurement of the instantaneous time interval $\Delta\theta\mu,\nu(t)$, but to also determine the angle $\phi\mu,\nu$ enclosed by these marks. Now it is possible in principle to carefully measure a mark carrier in accordance with the invention, which is manufactured at little expense before its use in the inventive measuring process, and to thereafter store the individual angular distances between the mark of the one and the marks of the other group, for instance in an electronic read only memory, and to retrieve them for the calculation operations required later on. This would, however, mean that extremely high requirements would have to be made on the exactitude of the radial course of the individual marks in each group and on the long-term constancy of the complete geometry of the construction.

To avoid these difficulties, a calibrating run, employing the inventive angle measuring device itself, is carried out at least once before the actual angle measuring operation. First of all, the angular distances between the respective immediately adjacent marks within each of the mark groups are determined in that the time intervals of the sensor signals assigned to these marks are measured at least for the duration of a complete rotation of the mark carrier. The size of the time interval values thus obtained will naturally depend on the existing angular velocity or rotational speed of the mark carrier. The time interval must therefore by multiplied by the value of this angular velocity so that the required calibrating values are obtained for the following measurements. These calibrating values are then stored in such a manner that their assignment to the individual and re-identifiable marks is maintained.

The angular velocity of the mark carrier herein incorporated may, for instance, be known from the fact that the drive which sets the mark carrier in constant rotation is controlled so that the speed of this rotation is held constant at a given value. Apart from the circuit expenditure necessary for this purpose, it has the disadvantage that the calibrating values, which are incorporated as a substantial component in the angular measurement to be carried out at the end, can only be determined with the accuracy with which the control device, which keeps the rotational speed of the mark carrier functions. This is not sufficient for many applications.

For this reason it is provided in accordance with a particularly preferred embodiment of the inventive process that the inventive angle measuring construction itself determines the rotational speed of the mark carrier during the calibrating run in accordance with the simultaneously filed German patent application No. P 3,018,528 and its corresponding U.S. application Ser. No. 259,554 filed May 1, 1981 (entitled: "A process and an apparatus for measuring the angular velocity of a rotating body"), the contents of which are expressly included in the disclosure of the present application.

The foregoing can be done either by carrying out the above-described calibrating run measurements for the duration of at least two complete rotations of the mark carrier, if each of the mark groups is being sensed by only one sensor. Hence, at least two series of time interval values are obtained for each mark group, in which case values exhibiting the same position number within each measuring series always derive from the same pair of marks. Now if all measuring values of the various series of measurements, which correspond to one another in this manner, coincide within given tolerance limits, it can be concluded that the rotational speed of the mark carrier during these series of measurements, i.e. for example during two revolutions, was constant. If, during these revolutions and at least for one mark, the time intervals of the signals are measured, which were produced by this mark upon first and subsequent second passing of a sensor, i.e. upon a rotation of the mark carrier through exactly 360°, a direct measure is obtained therefrom for this rotational speed, which was constant during the calibrating run, and with which the measuring values either of the series of measurements obtained and stored intermediately during the first rotation or the measuring values of the second series of measurements, which are of course practically identical to the aforesaid values, are multiplied for obtaining the necessary calibrating values.

The specification to be observed for this process, namely that the angular velocity of the mark carrier must remain constant for at least two complete revolutions, can be fulfilled without difficulty since, even if the rotational speed of the mark carrier, which runs freely and is subject to absolutely no load, varies several times, there will always be periods in between in which no such variations occur. If one wishes to shorten the time during which the angular speed of the mark carrier must remain constant for carrying out a calibrating run, it is possible, for example, to scan each mark group with two diametrically opposite sensors. In principle, the process is exactly the same as described above except that in this case one may begin with the comparison of the two series of measurements resulting at the various sensors after half of a revolution, so that the complete calibrating run can be concluded within one complete revolution.

Another way for checking the constancy of the angular velocity is not to use the time intervals of the signals belonging to the respective immediately adjacent marks, but, for the duration of two complete revolutions of the mark carrier and for each mark, to measure the time interval between the signal triggered when this mark passes the sensor for the first time and the signal produced by the same mark when it passes this sensor the next time, and to compare all these 360° time intervals with one another. If a coincidence within prescribed tolerance limits results, it can be concluded that the rotational speed of the mark carrier has been constant during this period and the simultaneously measured time intervals of the signals belonging to respectively adjacent marks can be used as calibrating values after appropriate transformation.

The calibration measurements described above must be carried out at least once before starting actual angle measurement. In order not to have to make high demands on long-term constancy, in particular of the geometry of the measuring construction, it is, however, preferred to repeat the calibrating run for continuous re-calibration. This can be carried out between the individual angle measuring procedures.

However, it is fundamentally no great problem to obtain, practically simultaneously with the angle measuring procedures, measuring values which can be used for continuous recalibrating of the system. By way of example, it is possible upon each revolution of the mark carrier to measure at each sensor the time intervals between all immediately subsequent sensor signals and to compare them with the corresponding time values of the preceding revolution. If it turns out that the values obtained do not coincide with prescribed tolerance limits, the old, stored calibrating values are first of all maintained and the deviation occurring is interpreted as an indication of an instantaneous variation within the measuring system. However, as soon as two subsequent revolutions of the mark carrier again lead to the same time interval measurements, i.e. these time interval measurements coincide within prescribed tolerances, new calibration values can be formed immediately and stored, instead of the old calibration values. In this manner, the measuring construction is in a position to react very quickly to any drift occurring and to eliminate the influence of such drift.

Since the calibrating measurements described only lead to calibrating values for the angular distances of the individual marks within each mark group, but do not say anything about the angular distances between the marks belonging to different mark groups, they must be supplemented by an appropriate second step which effects the necessary angular correlation between the mark groups, at least if two spaced mark groups are provided on the mark carrier or if only one mark group exists which is sensed by the two sensors on tracks which are radially clearly spaced.

For this purpose it is preferred to use the process wherein at least one time interval between signals is measured, one of which signals is produced at the one sensor by a known mark of the one group and the other of which signals is produced at the other sensor by a known mark of the other group. If the instantaneous speed of rotation of the mark carrier is known, the angular distance, which is with respect to the angle enclosed at this instant between the radial rays of the two sensors and defining the point of origin or zero point of the angular measurement, of these two marks belonging to the different groups can be calculated, thereby producing a connection between the two groups.

With this measurement and calculation, the true angular distance of the two marks in question on the mark carrier cannot be measured. Instead, only the apparent angular distance of these marks can be measured, which is reduced by the zero angle (which itself cannot be measured by the inventive apparatus) enclosed at this time between the two radial rays extending through the sensors.

This time interval measurement thus defines an arbitrary zero point of the angular measurement which, due to the inventive process, can be determined absolutely arbitrarily and can be changed again as required. By way of example, if the time interval measurements in question are carried out at a time at which it is ensured that the two radial rays extending through the sensors coincide exactly, this position of the two members, whose angular distance is to be measured, is defined as the zero position. If, on the other hand, the zero position of the angular measurement is defined in that two edges of the members, which are rotatable with respect to each other, are aligned in it, in which case said edges move towards each other or away from each other upon rotary movement of the members, then the above-described time interval measurement, which produces the connection between the two mark groups, is carried out when these two member edges are in the desired position.

The connection between the two mark groups, which is with respect to the zero point of the angular measurement, can, in accordance with the invention, also be produced in that the time intervals for a multiple of mark pairs are measured in the manner described and are multiplied by the instantaneous angular velocity for determining the corresponding angle. If the mean value is calculated from this plurality of measurements, the accuracy of the measurement can be increased even further.

In order to achieve a correspondingly high resolution capacity of the angle measurement, within the individual mark groups, the angular distances, which are referred to as the zero point of the angle measurement as defined above, are calculated and stored for a plurality of pairs of marks, of which the one always belongs to the one group and the other belongs to the other group, so that they are then always available for the actual angle measurement, use being thereby made of the angular distances, which are known from the calibrating run.

Up to now, it was always assumed that the instantaneous angular velocity of the mark carrier is known and that for this reason its value is available for the calculations as are necessary for example in accordance with equations (1). As already explained, this can be achieved by controlling the drive means for driving the mark carrier for continuous rotation to a constant angular velocity. This, however, leads to the difficulties mentioned, in particular with respect to the accuracy of the instantaneous angular velocity value.

A particular advantage of the inventive process is to be seen in that it is possible by means of time interval values to measure the instantaneous angular velocity of the mark carrier extremely accurately, not only during the calibrating run but during each revolution. If the absolute values of the angular distances of the marks of at least one mark group are known, which is the case after a completed calibrating run, the instantaneous angular velocity or rotational speed of the mark carrier can be determined by measuring the time intervals of the signals produced by these marks at the corresponding sensor and comparing them with the stored calibrating values in accordance with the following equation:

$$\omega(t) = \frac{\Delta T_{E\mu, \mu+1}}{\Delta T\mu, \mu+1(t)} \omega E \qquad (2)$$

Here, $\omega(t)$ stands for the instantaneous angular velocity of the mark carrier, $\Delta T_{E\mu, \mu+1}$ is the time interval determined during the calibrating run between the two sensor signals belonging to the identified marks $\mu$ and $\mu+1$, $\Delta T\mu, \mu+1(t)$ is the instantaneously measured time interval of the signals belonging to these marks, and $\omega_E$ is the angular velocity determined during the calibrating run.

For determining the instantaneous angular velocity $\omega(t)$ from the stored calibrating values and the instantaneous value $\Delta T\mu, \mu+1(t)$, all that is required is a simple calculating which can be carried out electronically without any difficulty and with little technical expenditure.

In the process for measuring the instantaneous angular velocity $\omega(t)$ of the mark carrier, it is of particular importance that the respective measuring values are always only the integration of the differential value "angular velocity" across the very short period which lies between the sensor signals used which are directly assigned to subsequent marks. On no account is the arithmetic means of the angular velocity calculated over one or even more complete revolutions of the mark carrier, so that the specification during the calibrating run concerning the constancy of the angular velocity over a long period is omitted. The instantaneous angular velocity $\omega(t)$, which is required for determining $\phi(t)$, can therefore be measured with the required accuracy, even if the mark carrier just happens to be changing its speed of rotation.

It follows from what is explained above that all values required for calculating the instantaneous angle $\phi(t)$ in accordance with equations (1) can be obtained in accordance with the inventive process by mere time interval measurements between sensor signals.

However, since time intervals between two subsequent electric signals can be determined very accurately electronically and without high technical effort and expense, for example by means of a quartz-controlled oscillator circuit, the unknown angle $\phi(t)$ is obtained with the accuracy of the time measurement used and completely independent of with what accuracy or regularity the marks scanned by the sensors are arranged on the mark carrier. By way of contrast to the known angle measuring methods, substantial manufacturing costs can be saved by using a very low-cost mark carrier, and only a very small part of the costs saved are consumed by the somewhat larger electronic measuring and evaluating expenditure.

Beyond that, all particular measures for ensuring long-term constancy can be dispensed with for all parts of the inventive measuring device with the exception of the time measuring unit, since, as already explained, a measuring system operating in accordance with the inventive process is automatically calibrated over and again and is thus able to completely eliminate the influence on the measuring result caused by short-term variations and long-term drift.

In principle, it is possible to measure the time interval between two randomly selected, identified marks, of which one belongs to one mark group and the other belongs to the other mark group, for determining the instantaneous angle between the two members rotatable with respect to each other. However, in a special case of the measuring process where two spaced mark groups are present, i.e. one of which is scanned by the one sensor and the other of which is scanned by the other sensor, the time intervals $\Delta\theta\mu\nu(t)$, which are required in equation (1), are not measured between randomly identified marks of the one and the other mark group but are measured such that the time interval measurement in an individual case is started by the passing of a random, identified mark, which is indicated here by the counting index $\mu$. The measurement is stopped by the immediately following signal which occurs at the other sensor and which is assigned to the appropriate identified mark of the other group, which is indicated by the counting index $\nu$. These time intervals are referred herein as "mixed" time intervals so as to clearly indicate that they are measured between signals belonging to marks from different groups.

In order to be able to use the time intervals $\Delta\theta\mu$, $\nu(t)$ in an appropriate manner for calculating the instantaneous angle $\phi(t)$ between the two members, the angular velocity $\omega(t)$ of the mark carrier during the respective measuring period must be constant in the sense that it has the same value at the time, at which the mark $\mu$, which starts the measurement, passes its sensor, as at the time, at which the mark $\nu$, which ends the measurement, releases the corresponding signal at the other sensor.

However, since the instantaneous angular velocity $\omega(t)$ cannot be determined at these times as an infinitely small value but, in each case, only as the mean value over the period of time (although very small) which elapses until two directly succeeding marks have passed a sensor, the constancy of the angular velocity in the above sense is preferably checked by determining at the respective sensor its mean value over a period of time directly preceding the measurement of $\Delta\theta\mu$, $\nu$, namely in the time between the passing of the $(\mu-1)$-th and the $\mu$-th mark, and over a period of time directly following the measurement of $\Delta\theta\mu$, $\nu$, namely in the time between the passing of the $(\mu+1)$-th and the $(\mu+2)$-th mark, and by comparing these two mean values with each other. If they coincide within prescribed tolerance limits, it can be very reliably concluded that the angular velocity has not varied in the above sense during the measurement of $\Delta\theta\mu$, $\nu$.

Since, preferably, a multiple of "mixed" time intervals are measured, for instance so as to further increase the measuring accuracy by forming the mean value of the angular values thus obtained, it is appropriate to constantly use the angular velocity values, which are continuously measured for checking as described hereinbefore. If it should turn out that the angular velocity of the mark carrier varies temporarily, the values $\Delta\theta\mu$, $\nu$, obtained in this period, are not used for calculating the instantaneous angle between the two members. On the other hand one waits instead until the angular velocity $\omega(t)$ of the mark carrier becomes constant again. Since, as already mentioned, this constancy must only be ensured for very short periods, namely only until four directly following marks have passed a sensor in order to obtain a further angle measuring value, this will generally occur very quickly.

Before forming the mean value from several angle measuring values, it must be first determined whether or not a rotary movement between the two members has occurred during the measuring time or whether some other disturbance has occurred which affects the measuring result. This is achieved by comparing the individual angle measuring values and only then forming the mean value if they coincide within prescribed tolerance limits.

It is to be pointed out at this stage that, due to the free rotatability of the two members with respect to each other, angular positions can easily occur in which the time interval to be measured between the signals from the two sensors becomes practically indefinitely small. Therefore, in accordance with the invention, the time measurement is carried out such that such "near coincidences" or genuine coincidences are detected and evaluated in the correct manner. For the resolution capacity of the measurement of the angle $\phi$, which is instantaneously enclosed by the two members or by the aforesaid radial rays, this means that this resolution capacity is determined, not by the angular distance of the adjacent marks on the mark carrier, but solely by the very high resolution capacity of the time interval measurement used.

A particularly important aspect of the inventive process is seen in than an angle measuring apparatus operating according to the process can be used without any particular additional technical expenditure as an extremely accurately operating revolution meter (tachometer), particularly for very low speeds of rotation up to a few thousandths of a Hertz or less. For if, as described above, a series of time interval measurements are carried out between the signals corresponding to the marks belonging to various mark groups, and if these values are compared with one another, an increasing change of these values due to relative rotation between the two members during this period can be determined with high accuracy, and the angular velocity, on which such relative rotation is based, can be calculated therefrom.

Alternatively, the aforesaid measurements, which are necessary for determining the instantaneous speed of rotation of the mark carrier, can be carried out at both sensors and the corresponding angular velocity can be determined from a comparison of the different results obtained at both sensors.

In accordance with the invention, the two methods described for measuring low angular velocities can also be combined.

It results from the aforesaid that the accuracy of the angle measuring process described depends solely on the accuracy with which the time intervals, which are of interest in each case, are measured. Hence, this time interval measurement is particularly important in the inventive method, and it is preferably provided that the pulses of a free-running, quartz-controlled oscillator are counted for the various time interval measurements and the count attained after the rising edge of the next oscillator pulse after a signal occurs at the one or the other sensor is read out and processed further.

In accordance with the invention, the next falling or simply the next pulse edge can be used instead of the next rising edge. In all cases, this process enables the time intervals of interest to be obtained in that the difference is formed between the respective counts and multiplied by the very accurately known and determined period length or half period length of the oscillator period. However, this only leads to high measuring accuracy provided that the signals, the time intervals of which are to be determined, are so far apart and/or that the oscillator oscillates with such a high frequency that such a large number of oscillator periods or pulses occurs between the two signals that this fact plays no important part any more, that in this kind of measurement the smallest unit of time, which cannot be further subdivided, is the length of a whole or a half oscillator period.

Since, as already mentioned, the time interval between two signals, which are emitted by different sensors, can be indefinitely small, the above condition can only be fulfilled for oscillators oscillating with an extremely high frequency in the case of which two events occurring within one oscillator period or half period can be simply considered to be "simultaneous", without this causing grave measuring errors.

In order to avoid the expenditure necessary for such extreme high-frequency oscillators while nevertheless obtaining highly accurate time interval measurements, it is preferred that, for determining the position as to time of the sensor signals within the respective oscillation period of the oscillator, in each case a time/amplitude converter circuit, which is assigned to the respective sensor, is started by the signals and is stopped by the rising edge of the next oscillator pulse.

If the two signals, whose time interval is to be measured, are so far apart that one or more oscillator periods occur between them, their time interval is determined in this process practically by three individual measurements, namely an approximate time measurement obtained by counting the oscillator pulses, and two precision time measurements obtained by means of the time/amplitude converter circuit or circuits, and the results of the latter are added up correctly as to sign to form the complete time interval.

On the other hand, if the two signals are so close to each other that they fall into the same oscillation period of the oscillator (approximate measuring value =0), which can happen only in the case of signals deriving from different sensors when the oscillator frequency is selected suitably with respect to the speed of rotation of the mark carrier and the number of marks contained in one mark group, an individual time/amplitude converter circuit is provided for each of the signals which measure the time distance of the respective signal from the next rising side of an oscillator pulse. The difference between these two precision time measuring values then gives the wanted time interval value very accurately, even if it is almost or exactly equal to zero.

Since, over long periods, drift may occur in the ordinary time/amplitude converter circuits, in which case the output amplitude, which is achieved within a given period of time after the start signal, changes, a particularly preferred embodiment of the inventive process provides that each time/amplitude converter circuit is recalibrated over and again in that it is started by a edge of an oscillator pulse and stopped by a subsequent edge of an oscillator pulse, and that the time value of the time/amplitude converter circuit thus obtained is compared with the period of time between these two edges of the oscillator pulse.

It has been already explained above that the accuracy and long-term constancy of the inventive angle measuring process depends only on the accuracy and long-term constancy of the time measuring method used for measuring the angular distances. Because of the fact that the time/amplitude converter circuits, which in no way have the long-term constancy of quartz, are continuously recalibrated by means of the quartz, even in the case of the time measurement which resolves as to time the oscillation periods of the quartz-controlled oscillator, the complete angle measuring process obtains the same accuracy and long-term constancy as the quartz, without any particular demands having to be made on the remaining parts of the inventive apparatus. Since quartz crystals are available at little cost, which oscillate highly accurately over long periods, the inventive process provides an extremely low-price and nevertheless highly accurate angle measuring device.

The ordinary time/amplitude converter circuits further have the property that the amplitude of their output signal rises linearly with time only after a certain initial period after each start signal, a more or less high degree of non-linearity being present immediately after the start signal. Since the free-running oscillator is in no way synchronized with the sensor signals, it is quite simply possible that such a short period of time lies between the sensor signal starting the time/amplitude converter circuit and the next edge of the oscillator pulse used for stopping the measurement, that the time/amplitude converter circuit may operate in the non-linear range, which can lead to falsification of the time value obtained.

In order to obtain results which can be reproduced even better and which are more exact, the invention provides that the time/amplitude converter circuit is stopped with a predetermined delay by the rising edge of the appropriate oscillator pulse in the case of each time interval measurement and each calibrating measurement, and that the time/amplitude converter circuit is started after each of these measurements by a start signal produced within the circuit and is again stopped by a stop signal, which is produced at the same time as this start signal and is also subject to the predetermined delay, and that the correction value thus obtained is subtracted from the time value obtained beforehand.

Thus, the period during which the time/amplitude converter circuit operates in the case of each time interval measurement and also in the case of each calibrating measurement is extended by a predetermined period by this measure, and this extended period is selected so as to be definitely larger than the period during which the amplitude of the output signal of the time/amplitude converter circuit increases non-linearily. Immediately after the value thus obtained is placed in intermediate storage, the time/amplitude converter circuit is set back to its initial state and is then started again by a start signal produced internally. A stop signal is produced internally at the same time as this start signal and is fed to the time/amplitude converter circuit along the same path on which it receives the stop signal deriving from the edge of the oscillator pulse during the actual time measurements.

This stop signal produced simultaneously with the internally produced start signal thus obtains the above-mentioned delay as well so that the time/amplitude converter circuit operates for a period which corresponds to this delay (and possibly to transit time differences existing between the start and stop lead, which are present in the same manner in the case of the actual time measurement), despite the simultaneous triggering of both signals. Hence, a correction value is produced by means of which exactly those transit time differences and non-linearities are covered which are contained in the immediately preceding time measurement. This correction value is subtracted from the time interval value or calibration value which is still in intermediate storage. This difference is a value which is like the one that would be obtained with a time/amplitude converter circuit which operates perfectly linearly and which is controlled without propagation delay differences and it is thus ideally suitable for further processing. Since the correction values are always obtained immediately after the measurements to be corrected, the affects of long-term drifts, which may possibly occur at this point, are eliminated.

Furthermore, in accordance with a particularly preferred embodiment example, it is provided that from the real marks disposed on the mark carrier ideal marks are abstracted by each sensor and that their time intervals are measured.

The result of this is not only that no particular demands need by made on the long-term dimensional accuracy of the material used for manufacturing the mark carrier nor on the accuracy of the angular positioning of the marks disposed on the mark carrier, but also that the width and the concrete geometric shape of these marks and the accuracy of their radial course no longer play a substantial part as regards their affecting the accuracy of the angle measurement.

Here it is of particular importance that the width of the real marks as seen in the direction of rotation can be selected so as to be substantially larger than was possible in accordance with the prior art, without thereby in any way affecting the measuring accuracy of the process. In actual fact, the signal to noise ratio at the output of the sensors can be substantially enhanced by the larger width of the marks, whereby, on the one hand, the circuit expenditure necessary for processing the wanted signals can be substantially reduced and, on the other hand, the measuring accuracy can be even further improved.

The abstraction of the ideal marks from the real marks is advantageously carried out in that the crossover of an electric signal, which is derived from the signal emitted by the sensor when a mark passes, through a predetermined constant voltage level, serves as an ideal mark, and, preferably, a differential photo receiver with at least one subtracting member connected downstream thereof is used in each case as a sensor, and the zero crossover of the output signal provided by the subtracting member when a mark passes the differential photo receiver serves as an ideal mark.

As a differential photo receiver, a differential photo diode can be used whose light-sensitive surface is subdivided into two halves or four quadrants by one or two separating ridges, respectively.

In the first case, the photo diode is arranged such that its separating ridge runs approximately radially with respect to the axis of rotation of the mark carrier. For signal processing, only a subtracting member, preferably a differential amplifier, is connected downstream of the photo diode, and the two inputs thereof are each connected to one of the two halves of the photosensitive surface. Upon each mark passing, the subtracting member emits an output signal for each mark, the zero crossover of which defines a kind of "optical centroidal axis" of the real mark in a manner which can be reproduced at least for short periods, and which is thus excellently suitable as an ideal mark which is practically "punctiform" as to time; the term punctiform denotes the condition wherein a signal which has a very steep (rising or falling) edge, which crosses a predetermined voltage level in an extremely short (i.e. punctiform) period of time. It is possible that the "mark centroidal axes" thus formed may slightly change their angular distances with respect to each other over long periods of time due to the drift of, for instance, the photo-sensitivity of the photo diode. This is, however, irrelevant because of the continuous recalibration carried out in accordance with the invention.

In the second case the photo diode is arranged such that one of the two separating ridges again runs approximately in the radial direction while the other extends approximately tangentially to the path described by the sensor with respect to the mark carrier during the rotation of the latter. Two subtracting members are used for processing the four signals resulting in this construction when a mark passes, and these two subtracting members are connected such that their two inputs in each case receive the signals from two quadrants of the photo-sensitive surface which are opposite each other with respect to the point of intersection of the separating ridges. In such a construction the signals, or their zero crossovers, which are emitted by the two subtracting members when a mark passes, are displaced as to time with respect to each other if the borderlines of the mark do not run exactly symmetrically to the radially extending separating ridge of the photo diode. From a change in the time interval of these two signals belonging respectively to one mark, the extent of any radial relative displacement occurring between the sensor and the mark carrier can be determined and a recalibration of the system can be carried out automatically, for example, when a prescribed tolerance limit is exceeded. Any eccentricies occurring can also be detected with this construction.

It is provided that, for each output signal emitted at the differential photo receiver by the subtracting member when a mark passes, a rectangular pulse is produced, at least one edge of which is at a fixed time distance from the zero crossover of the output signal, and that the time intervals of these signs are measured and further processed. The rectangular pulses, which are emitted by the transmitter comprising sensor, subtracting member and subsequent buffer circuit may be embodied, for instance as regards the steepness of their sides and as regards their amplitude, such that they are suitable for triggering the ordinary commercial TTL-IC digital components, whereby the subsequent evaluating circuit can be constructed at particularly low cost. In accordance with the invention, however, other discrete or integrated circuit components may also be used for further processing the signals. All that is important is the strict assignment as to time of a clearly detectable part, such as for instance the assignment of the rising edge of the signal, which is produced by the transmitter when a mark passes the sensor, to this mark so that the time interval of these signal parts can in fact be used as a measure for the angular distance of the marks.

The components, which substantially comprise electronic circuits, need not necessarily be present individually beside one another but may be amalgamated circuitwise. Thus it is, for instance, possible for the identification circuit, the control circuit and the comparison circuit with the calculation circuits to be comprised in a single calculator which carries out the appropriate functions in series or parallel. Such calculators are available at low cost in the form of microprocessors so that their use is in no way in conflict with the object of the invention, namely to provide an angle measuring apparatus which is extremely accurate and nevertheless inexpensive.

In a preferred example of the inventive apparatus the time measuring unit comprises a quartz-controlled oscillator, a counter for counting the oscillator periods and two time/amplitude converter circuits with analog to digital converters connected downstream thereof, in which case the time/amplitude converter circuits can be triggered by signals emitted by their corresponding transmitter and stopped by signals emitted by the quartz oscillator.

Since it is necessary to ensure a sequence of the individual time measurements which is correct as to time and functioning, the time measuring unit further comprises a sequence or operation control which may be either individually constructed or integrated in the operation control of the complete measuring system as realized for instance by means of a microprocessor.

It is important that an operation control is provided which assumes the aforesaid function and, if necessary, ensures in addition that the time/amplitude converter circuits are re-calibrated over and again between the precise time measurements, by means of the oscillator, and that, both after every precise time measurement and after every calibrating measurement, the correcting values described above are obtained and processed in the necessary manner.

It is possible to separately digitize the analog measuring and correction values emitted by each time/amplitude converter circuit and to process them further afterwards. However, they are preferably stored in intermediate storage in analogous form by means of sample and hold circuits, are then subtracted from one another by means of a differential amplifier, and only then are passed on to an analog to digital converter.

As already mentioned, it is possible in the inventive process to use ideal marks, i.e. marks which are practically punctiform with respect to time, instead of the real marks present on the mark carrier, in which case the ideal marks are abstracted from the real marks. The direct result of this is that it is no longer necessary, in contrast to the state of the art, to make particular demands on the geometric shape of the marks. In particular, the marks need no longer be embodied in the direction of rotation as extremely narrow as was heretofore the case; instead, it is preferred that the marks of each mark group are embodied as stripes which differ from the adjacent portions of the mark carrier with respect to their optical properties and which run substantially perpendicular to the direction of rotation of the mark carrier. Electric signals then result, which can be particularly well processed, if the width of each mark stripe is larger than the width of the separating ridge of the differential photo diode and smaller than the width of the differential photo diode. The striped embodiment of the marks leads to a substantially improved signal to noise ratio at the sensor output since a substantially stronger optical contrast between the marks and the adjacent portions of the mark carrier can be achieved due to their greater width.

The mark carrier may be sensed by the sensor either by the reflected light method or by the transmitted light method. It must be ensured in each case that the measuring light beam emitted by the light source impinges the surface of the mark carrier as perpendicularly as possible, which means that, in the case of the reflected light method, the reflected light returns along the path of the impinging light. Since light source and light receiver may not be arranged at the same point, a beam splitter, such as for instance a semipermeable mirror, is used for decoupling the reflected light.

In order to achieve most favorable illumination of the photo receiver forming the sensor, it is appropriate to arrange the exit opening for the light of the lighting construction as near to the mark carrier as possible. This can be achieved in that the light source is arranged as near to the mark carrier as possible while using an image or condenser lens. In cases in which this not possible, for example for reasons of the space available, it is preferred that the light from the light source is provided in the immediate vicinity of the mark carrier by means of a fibre-optical light guide. This light guide can furthermore advantageously be used for homogenizing the light from the light source. Not only filament bulbs but also the light emitting diodes (LEDs or laser diodes), which are preferably used as light source, have a structure which leads to the light being emitted rather from a surface area than from a surface point, the individual points of this surface area shining with highly varying brightness. The light guide arranged between the light source and the mark carrier can perform a condenser function here, i.e. its front end facing the mark carrier appears as a substantially homogeneously shining surface, by means of which the photosensitive surface of the photo diode forming the sensor can be evenly illuminated.

ILLUSTRATION AND DESCRIPTION OF AN EMBODIMENT OF THE PRESENT INVENTION

THE DRAWINGS

The invention will now be explained in the following by means of embodiment examples and with reference to the drawings, in which.

Figure 3:
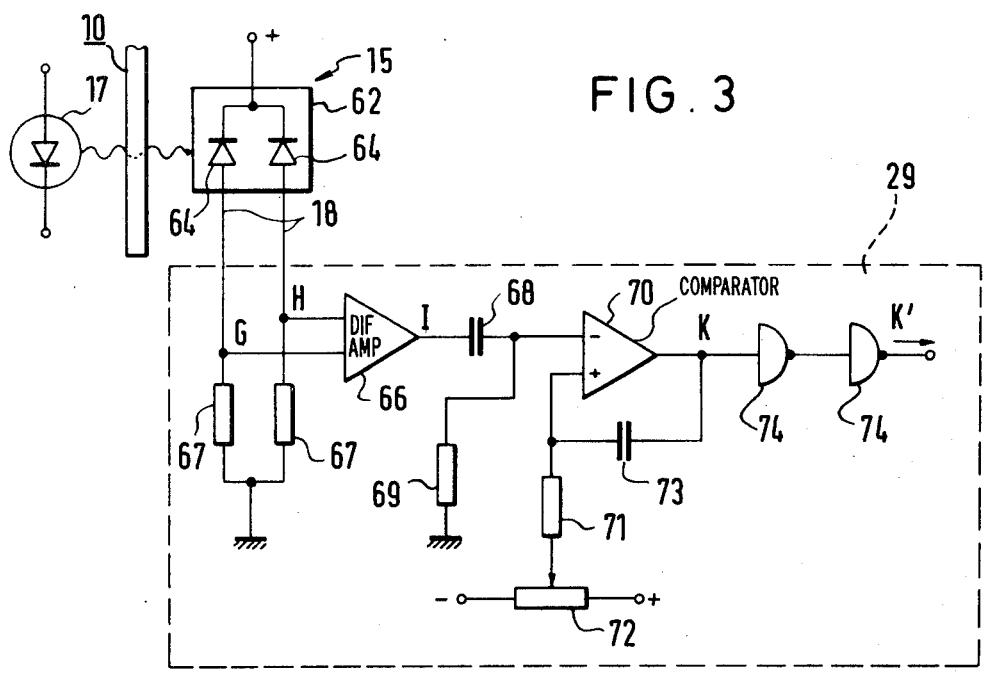
Figure 4:
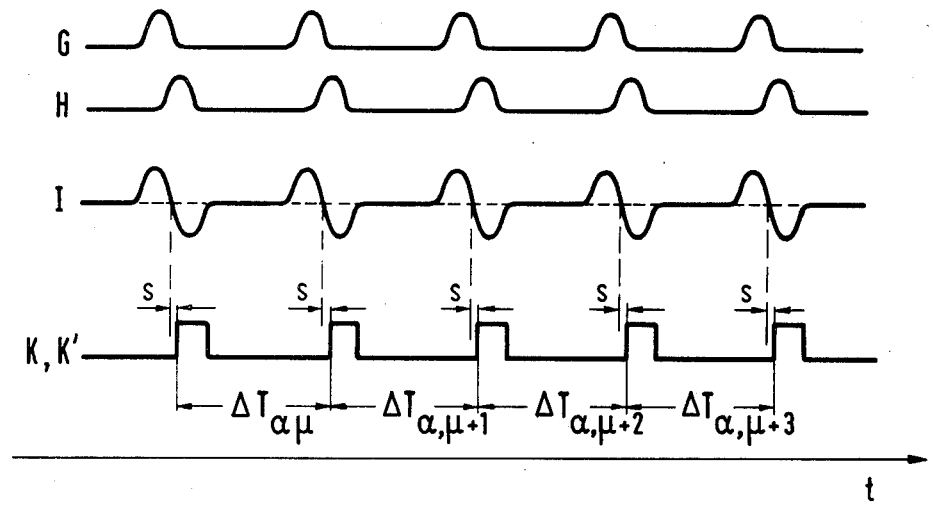
Figure 6:
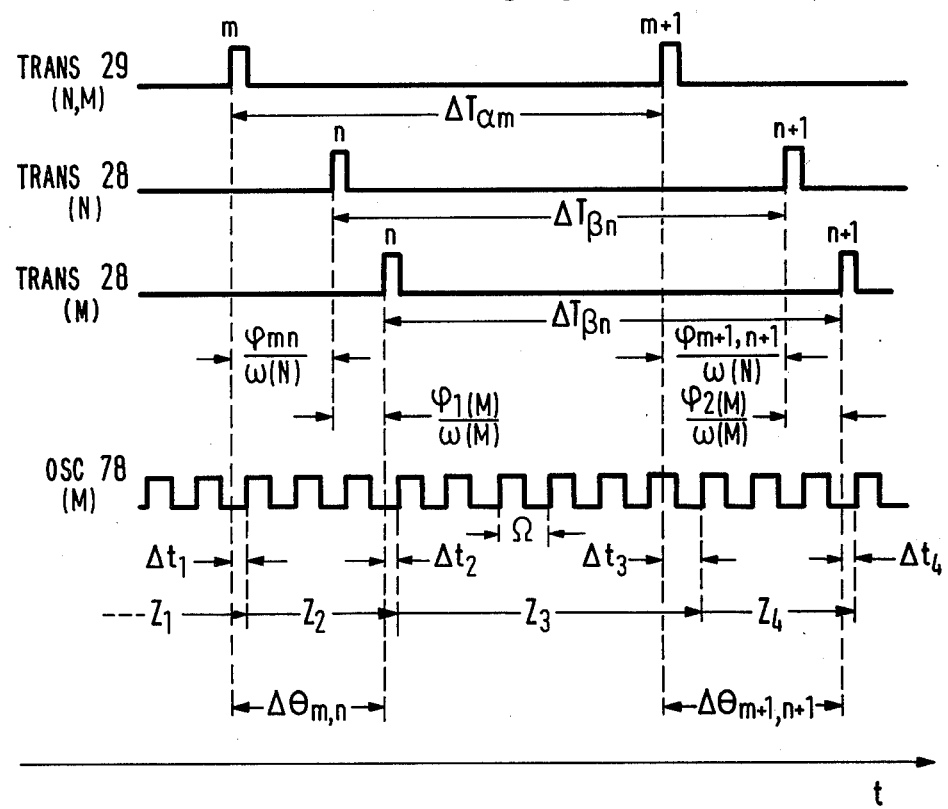
Figure 5:
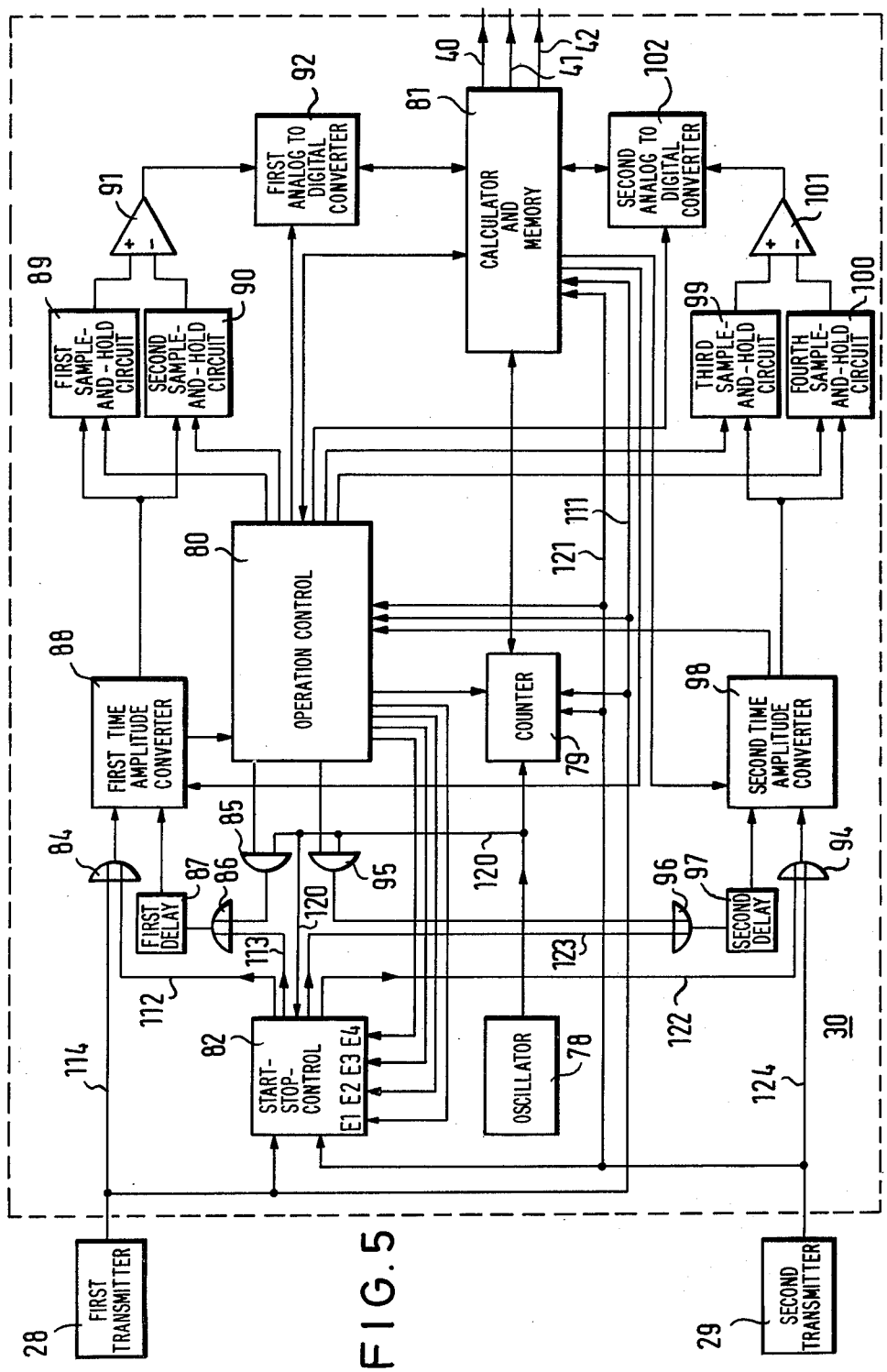
Figure 8:
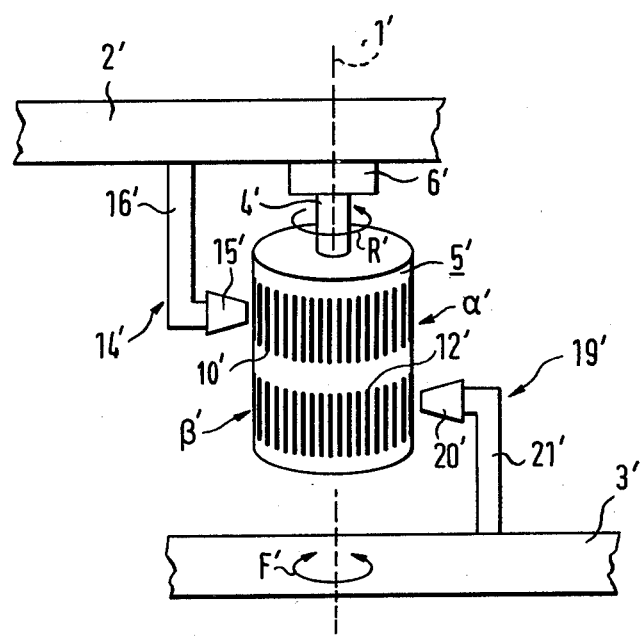

FIG. 3 is a circuit diagram illustration of a transmitter arranged downstream of a sensor, FIG. 4 is a diagram illustrating the electric signals appearing at various positions of the transmitter, FIG. 5 is a schematic block diagram of a preferred time measuring device, FIGS. 6 & 7 are signal diagrams illustrating the operation of this time measuring device, and FIG. 8 is a further embodiment example of an inventive mark carrier.

THE PREFERRED EMBODIMENTS

Figure 1:
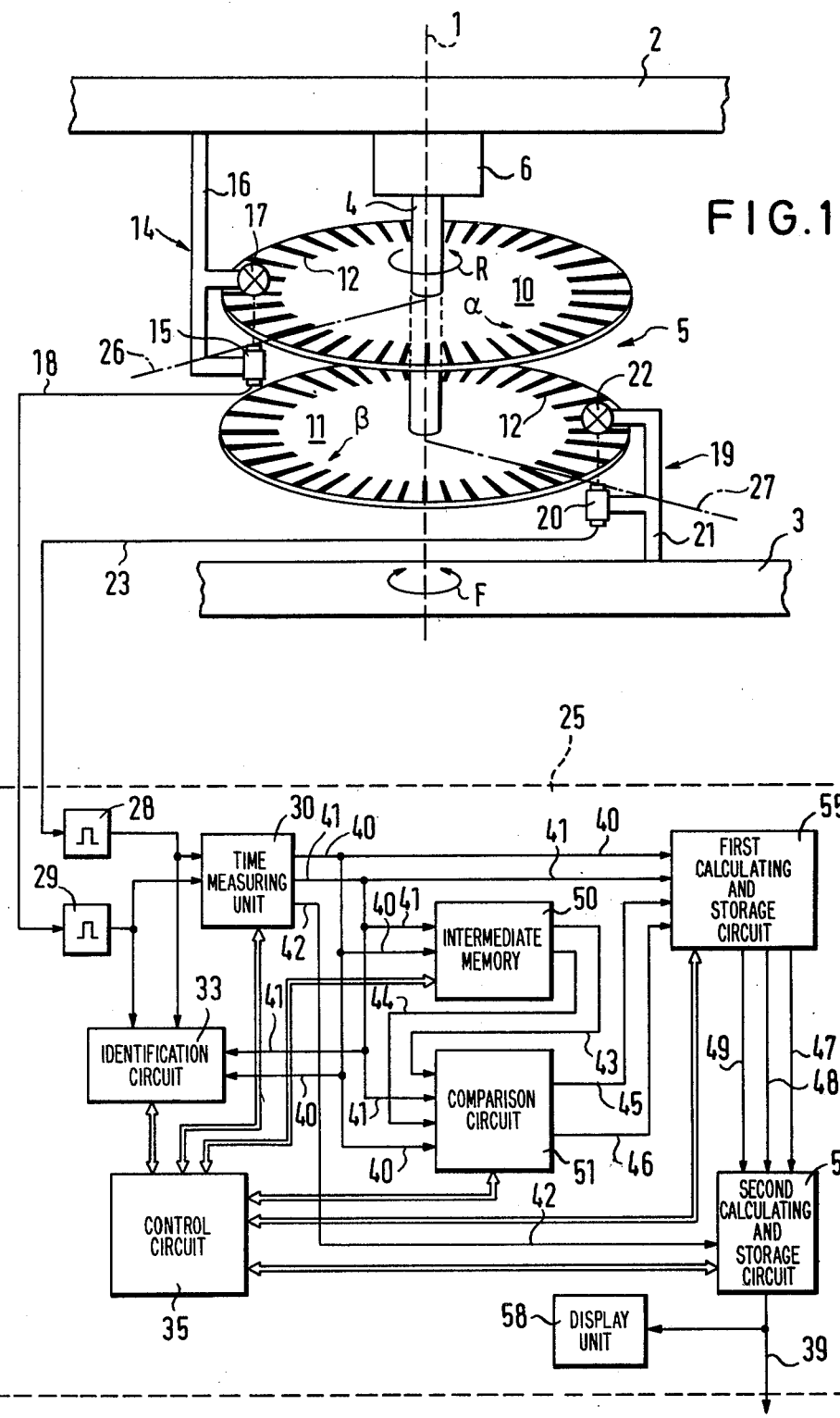
FIG. 1 is a schematic representation of an inventive measuring device.

Referring to FIG. 1, two members 2 and 3 are illustrated mounted coaxially on a common axis 1 to be rotatable relative to each other in the directions of the arrow F, the instantaneous angular distance of which is to be measured.

One of these members 2 carries a mark carrier 5 which is rotatably mounted by means of a shaft 4 aligned with the axis of rotation 1 and which is driven so as to constantly rotate in the direction of the arrow R by means of a drive 6 which is also attached to the member 2 and which may be either an electric motor, a gear or any other drive mechanism.

The mark carrier 5 comprises two circular discs 10 and 11 mounted on the shaft 4 at a certain axial distance from each other. The shaft 4 runs approximately through the midpoints of these discs. Striped marks 12 are arranged along the edge of each of the discs 10, 11 and these marks run radially and are spaced apart in the direction of rotation. In the illustrated embodiment, the marks 12 differ from the areas of the respective discs 10 and 11 surrounding them with regard to their light-transmitting capacity. The marks 12 as arranged on the disc 10 form a first mark group α which is separated from the second mark group β arranged on the disc 11. It is not necessary that a certain, given angular relationship exist between the mark groups α and β. Since within the scope of the inventive method the angular distances of the marks 12 belonging to the group α from the marks 12 belonging to the group β, which are related to the arbitrarily selected point of origin of the angular measurement, are determined by appropriate time interval measurements, the discs 10 and 11 can be mounted on the shaft 4 at any desired angular position with respect to each other.

The speed of rotation, at which the drive 6 causes the mark carrier 5 to rotate, is also in no way critical and no special measures need be taken for stabilizing it. While it is true that the speed of rotation of the mark carriers is a fundamental part of the measurement due to the fact that the angle in question is determined by time interval measurements, the speed of rotation is, in accordance with the inventive method, uninterruptedly measured with high accuracy and with a very high degree of resolution as to time, so that both short-term and long-term variations of the speed of rotation are always immediately detected and taken into account.

Furthermore, a first sensing device 14, which senses the marks of the group on the disc 10 is attached to the upper one of the two rotatable members. The sensing device 14 comprises a sensor 15 beneath the disc 10 on a support 16, and a light source 17 arranged above the disc 10. The sensor 15 and the light source 17 are arranged on the opposite sides of the mark disc 10 in such a manner that the line connecting the light source 17 and photodetector 15 is approximately perpendicular to the surface of the disc 10.

Thus, due to the rotation of the shaft 4 in the direction of the arrow R, non-light transmitting marks 12 and light transmitting intermediate spaces between the marks run alternately through the beam of light, which is thus modulated.

A light-emitting diode is preferred as light source 17 and this diode may either be a LED or a laser diode.

The opto-electric sensor 15 passes an electric signal via a lead 18 to a measuring and evaluating circuit 25 each time a mark 12 of the mark group α passes it.

Attached to the second rotatable member 3 is a sensing device 19 which senses marks of the second group located on the disc 11. The sensing device 19 is constructed in the same way as the sensing device 14 and comprises an opto-electric sensor 20 and a light source 22, preferably embodied as a light-emitting diode, and it is supported by a support 21. The signals emitted by the opto-electric sensor 20 when the marks 12 of mark group β pass it are fed to the measuring and evaluating circuit via a lead 23.

Taking the axis of rotation 1 as a base, radial rays 26 and 27, which are indicated by means of a dot-dash line are shown to pass through each of the sensors 15 and 20. Basically, it is the angle which is enclosed by these two radial rays 26 and 27 with respect to the axis 1, that is measured by means of the inventive method or the inventive means. However, it is not necessary to define the point of origin of this angular measurement by stating that the two radial rays 26 and 27 meet each other exactly in the projection extending in the direction of the axis 1. Instead, this point of origin may be selected absolutely freely so that the inventive means will measure and directly display, for instance the angle between two edges of the members 2, 3 approaching each other or departing from each other, as the case may be, in the projection extending in the direction of the axis 1 when the two members 2, 3 rotate in the direction of the arrow F.

The measuring and evaluating circuit 25 comprises two pulse generator transmitters 28 and 29 as two input members connected to the leads 18 and 23 respectively, which not only serve to form the sensor signals but also to obtain ideal marks, i.e. time marks which are practically punctiform, from the real marks situated on the mark carrier 5. The time intervals of these ideal marks can then be very accurately measured by a time measuring unit 30 disposed downstream of the transmitters 28 and 29.

Moreover, the measuring and evaluating circuit 25 comprises an identification circuit 33 which identifies the marks 12 of the groups α and β which pass the sensors 15 and 20 respectively at any given time. This identification can be carried out with the aid of the time intervals measured by the time measuring unit 30 for the pair of marks immediately preceding the mark in question or, in other words, with the aid of the quotient of the time intervals between the immediately preceding pairs of marks, and/or by counting the signals coming directly from the transmitters 28 and 29. The identification circuit 33 supplies the information individualizing the marks in question to a control circuit 35 which centrally controls the course of functioning in the total measuring and evaluating circuit in accordance with a determinable program. Since this control circuit 35 also has to obtain information concerning the state of operation at any given time of the remaining circuit components in order to perform its tasks satisfactorily, it is connected to these other components by transmission lines operating in both directions and this is symbolized in FIG. 1 by means of double lines provided with arrows at both ends.

In accordance with FIG. 1, the time measuring unit 30 basically comprises three signal output lines 40, 41 and 42. Of these, the first two 40 and 41 are each connected to the corresponding inputs of the identification circuit 33, an intermediate memory 50, a comparison circuit 51 and a first calculation and storage circuit 55. On these lines 40 and 41, the time measuring unit 30 delivers the time interval values $\Delta T\alpha\mu$ and $\Delta T\beta\nu$ which it has determined for the immediately following identified marks 12 of the signals of the transmitter 28 and 29 associated with the groups α and β respectively.

In a calibrating run, these time interval values $\Delta T\alpha\mu$ and $\Delta T\beta\nu$ and first of all measured for a random rotation of the mark carrier 5 and are stored in the intermediate memory 50 while their association with the corresponding marks and mark groups α and β is retained.

At the next rotation, the intermediate memory 50 delivers these values in this order on the lines 43 and 44 to the comparison circuit 51 in which the corresponding new values on the lines 40 and 41 appear. If each of the pairs of values derived from the two rotations following each other correspond with each other within given tolerance limits, which is an indication of the fact that the speed of rotation of the mark carrier 5 has been constant in this period, then the comparison circuit gives signals via the lines 45 and 46 to the first calculation and storage circuit 55 which cause the latter to refer to the new time interval values also fed to it via the lines 40 and 41 for calculating calibration values to be stored for a longer period, and which cause it to calculate the speed of rotation, which was determined to be constant during the two calibrating rotations, from the time interval values also delivered from the time measuring unit 30 during these two rotations for signals produced by one and the same mark at one of the sensors 15 or 20 and thus corresponding to a 360° rotation of the mark carrier 5.

As soon as a complete set of calibrated values for at least one of the two mark groups $\alpha$ or $\beta$ for the absolute angular distances of their marks is contained in the first calculation and storage circuit 55, the calculation and storage unit 55 can continuously calculate the instantaneous speed of rotation $\omega(t)$ of the mark carrier 5 from each time interval value for those mark groups newly produced by the time measuring unit 30, independent of whether or not the comparison circuit indicates a correspondence with the appropriate value derived from the preceding revolution.

The instantaneous speed of rotation $\omega(t)$ thus obtained, which can be newly determined during a revolution of the mark carrier 5 as often as marks are contained in the respective mark group, is passed on from the first calculation and storage circuit 55 to the second calculation and storage circuit 57 via the line 47.

This second calculation and storage circuit 57 further receives, via the lines 49 and 48, from the first calculation and storage circuit 55 the calibrated values referring to the angular distances within each of the mark groups $\alpha$ and $\beta$, as well as receiving from the time measuring unit 30 via the line 42 time interval values $\Delta\theta\mu$, $\nu$ (more fully defined hereinafter in the explanation of FIG. 3) for the signals obtained from marks contained in the various groups $\alpha$ and $\beta$.

From these "mixed" time intervals $\Delta\theta\mu$, $\nu$ and first of all on the basis of a command signal fed to the second calculation and storage circuit 57 (i.e. at an angular position of the two members 2 and 3 or of the radial rays 26 and 27 arbitrarily selected as point of origin, reference thereby being made to the calibrated values obtained through the lines 49 and 48 and to the instantaneous angular velocity $\omega(t)$ of the mark carrier 5 obtained via the line 47), the second calculation and storage circuit 57 calculates and stores, with reference to the origin of the angular measurement, a multiple of angular distances $\phi\mu$, $\nu$ of identified marks $\mu$ and $\nu$ of which one always belongs to the one group and the other always belongs to the other group $\beta$.

When this table of values, which gives the angular, point of origin correlation between the two mark group $\alpha$ and $\beta$, is finished, the calculation and storage circuit 57 can calculate the instantaneous angular position $\phi(t)$ between the two members from each newly obtained time interval $\Delta\theta\mu$, $\nu(t)$ of the corresponding instantaneous angular velocity $\omega(t)$ of the mark carrier 5 and from the stored table value $\phi\mu$, $\nu$. Then it passes on this result via the line 39 to a display unit 58 and/or to a further processing unit when it has been checked to determine whether the angular speed $\omega(t)$ of the mark carrier was constant during the measurement of $\Delta\theta\mu$, $\nu(t)$.

Since all the values used for calculating $\phi(t)$ were obtained from time interval measurements, the inventive angle measuring device determines the angle to be determined with the accuracy and the resolution of the time measuring unit 30 contained therein.

It will be noted that the signal transmission between the blocks of the measuring and evaluating circuit 25 illustrated in FIG. 1 may be carried out not only serially but also in parallel or in a mixed form. In the last two cases the connections illustrated with single lines will then also include a multiple of parallel transmission lines.

Before dealing in greater detail in the following with the construction and mode of operation of the time measuring unit 30, the cooperation between the mark discs 10 and 11 and the corresponding sensors 15 and 20 respectively and the construction and mode of operation of the transmitters 28 and 29 forming the signals of these sensors will now be described with reference to FIGS. 2 and 4. Since the basic construction of the mark discs 10 and 11 and that of the corresponding sensor and transmitter arrangements 15, 29 and 20, 28 are identical, only the mark disc 10, its corresponding sensor 15 and the transmitter 29 arranged downstream thereof shall be discussed in the following.

Figure 2:
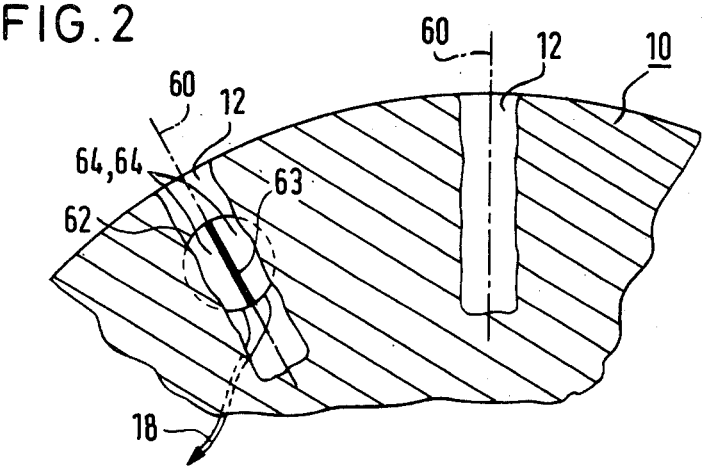
FIG. 2 is an enlarged section of a mark carrier.

FIG. 2 shows a section of a mark disc 10 illustrating two marks, in the case of which—in contrast to FIG. 1—the large surface of the disc does not transmit light so that the measuring light beam emitted from the light source can only reach the sensor when a mark 12 passes the sensor. In accordance with FIG. 2 this sensor basically comprises a differential photo diode 62, the photosensitive surfaces 64, 64[1] of which are separated from each other by a narrow ridge 63. As is clear from FIG. 2, it is not important that the marking stripes 12 should have a particularly well defined geometric shape, since an ideal mark is abstracted from them by means of the differential photo diode 62 and the transmitter described in detail hereinafter with reference to FIG. 3. This ideal mark is indicated in FIG. 2 by means of a dot-dash line. As FIG. 2 also shows, the lead 18 comprises two mutually insulated wires in the case of the use of a differential photo diode 62. In accordance with FIG. 3, these wires are, on the one hand, each connected to the two inputs of a differential amplifier 66 and, on the other hand, are also connected via load resistors 67 to the ground of the system.

In a particularly preferred example of the invention provision is made for an amplifier (not shown in FIG. 3) with a high amplification factor to be joined in circuit in each of the leads leading from the photo-sensitive surfaces 64, 64[1] of the differential photo diode 62 to one of the inputs of the differential amplifier 66, in order to pre-amplify the signals emitted by the photo-sensitive surfaces of the photo diode before their subtraction. In this matter it can be achieved that the output signal[I] of the differential amplifier 66 shown in FIG. 4 in the third line from the top has a very steep zero passage or crossover which is thus exactly fixed as to time and precisely detectable.

The output of the differential amplifier 66 is, for the purpose of direct-voltage decoupling, connected across a capacitor 68 to the negative input of a comparator 70 which is connected via a resistor 69 to the earth of the system. The positive input of the comparator 70 is connected through a resistor 71 to an adjustable, stabilized supply terminal which is illustrated as a potentiometer 72 for the sake of simplicity and which provides the necessary reference potential for identifying the zero crossover of the output signal delivered by the differential amplifier 66. The output of the comparator 70 is, on the one hand, connected to the input of the first of two inverters 74 serving as buffers, and, on the other hand, is fed back to the positive input of the comparator 70 through a capacitor 73 for producing a defined hysteresis. The inverter 74 may, by way of example, comprise TTL components which serve to form the signal emitted by the comparator 70 in such a manner that it can be fed without any problem into the circuit units connected downstream thereof.

The mode of operation of the transmitter illustrated in FIG. 3 will now be explained with reference to FIG. 4 in which the signals, which appear at the points G to K' of the transmission circuit 29 when a series of marks passes the sensor 15, are reproduced along a time axis.

Each time the measuring light beam is interrupted by a mark 12 or, in accordance with the example shown in FIG. 2, is allowed through, a half-wave occurs at the points G and H, and the signal at the point G is displaced in time with respect to the signal at the point H since the differential photo diode 62 is arranged in such a manner that its separating ridge 63 extends approximately in the radial direction with respect to the axis of rotation of the mark disc 10, so that at first one and then the other of the two photo-sensitive surfaces 64, 64$^1$ of the diode 62 is brushed over by the mark.

The differential amplifier 66 produces the signal I from the half-waves occurring at the points G and H, and the signal I has the steep zero crossover forming an ideal mark as illustrated in FIG. 4, when the peripheral width of the marks 12 is larger than the width of the separating ridge 63 and smaller than the diameter of the differential photo diode 62.

The zero crossover of the signals I is identified by means of the comparator 70 which is given an appropriate reference level by means of the potential source 72. The rectangular signals K appear at the output of the comparator 70, and their rising edges are very steep and stand in an unambiguous time relationship with the zero crossover of the signals I. The delay s occurring between each such crossover and the corresponding rising edge of the pulse is highly exaggerated in FIG. 4. In actual fact, it is so small that any short-term variations of this delay will not affect the accuracy of the measurement result. Since the same is true for the signal delays occurring at the buffer inverters 74, the signal K' occurring at the output of the second inverter 74 can be set equal to the signal K at the output of the comparator. The rising edges of the rectangular pulses K' thus represent ideal marks which clearly and, at least for a short period, exactly reproducibly correspond to the optical centroidal axes 60 of the corresponding mark stripes 12. The time distances $\Delta T\alpha\mu$ of these ideal marks are, at a given angular velocity of the mark carrier, an exact measure for the absolute values of the angular distances between these optical centroidal axes. If, conversely, these absolute angular distances are known, the instantaneous angular speed $\omega(t)$ of the mark carrier 5 can be calculated very accurately from the values $\Delta T\alpha\mu$.

A preferred time measuring unit 30 for highly accurate measurement of the time distances $\Delta T\alpha\mu$, $\Delta T\beta\nu$ and $\Delta\theta\mu\nu$ is illustrated schematically in FIG. 5. It is based on the principle that, on the one hand, the oscillation periods of a free-running quartz-controlled oscillator 78 are counted by means of a counter 79 for determining rough time values. However, since this, as a one and only measuring method, would either require a very high-frequency oscillating oscillator or would otherwise lead to relatively inaccurate results, on the other hand, in addition, measurements are provided for determining the time position of the signals, whose time distances are to be determined, within an oscillator period.

As the above explanation shows, time distances must be measured both between signals, all of which appear at one of the sensors, i.e. which belong to marks of the same group, as well as between signals, one of which derives from one sensor 15 and the other which derives from the other sensor 20. The time distances of the first type are identified in the present context by $\Delta T\alpha\mu$ or $\Delta T\beta\nu$, in which case the first index stands for the appropriate mark group and the second index is a counting index. On the other hand, the time distances of the second type are identified by $\Delta\theta\mu\nu$, in which case $\mu$ stands for the appropriate, identified mark of the one group and $\nu$ stands for the appropriate, identified mark of the other group.

For producing the approximate values mentioned above, it is sufficient to provide a counter which counts the oscillation periods of the quartz-controlled oscillator 78 (FIG. 5) and from which the next counting value is always read out under the control of the operation control 80 into the calculator and memory 81 when one of the two transmitters 28, 29 emits a signal.

The calculator and memory 81 is also connected to the transmitters 28 and 29 via the lines 111 and 121, and it can therefore identify whether the read out counting value belongs to a mark signal of the $\alpha$ or $\beta$ group, or whether both transmitters 28, 29 emitted a signal within the previous oscillator period. As already mentioned, the latter case may always occur since the two sensors 15 and 20 can always assume angular positions in which in each case a mark of the groups $\alpha$ and $\beta$ respectively passes them at exactly or almost exactly the same time.

This situation leads to the result that, in accordance with the invention, individual time/amplitude converter circuits 88 and 98, with the corresponding additional circuits, are provided for determining the precision time values for each transmitter 28 and 29 respectively, since a time/amplitude converter circuit is, on its own, not in a position to identify the occurrence of a further signal at the transmitter 29 and to determine its time interval up to the next rising side of an oscillator pulse during measurement of the time interval of a signal deriving from the transmitter 28, for instance, up to the next rising side of an oscillator pulse, nor during a subsequent insensitive period.

The inventive time measuring unit 30 thus comprises two separate channels for the precision time measurements, each of which is connected downstream of one of the two sensors, 15, 20 or transmitters 28, 29. Since the construction of these two precision time measuring channels is identical in each case, a description of the channel arranged downstream of the transmitter 28 will suffice. In this description, the reference numbers for the corresponding circuit units of the second channel are added in brackets.

The time/amplitude converter circuit 88 (98) provided for measuring the precision time values basically comprises a capacitor which, after being triggered by a START signal is charged by means of a stabilized constant current source, so that the voltage across this capacitor increases linearly in the course of time, after a short initial phase, until the charging operation is cut off by a STOP signal. The amplitude of the signal appearing at the output of the time/amplitude converter circuit after the STOP signal is a measure for the period which has elapsed between the START and the STOP signal. In the case of the time measuring unit 30 in accordance with FIG. 5, the time/amplitude converter circuit 88 (98) is employed in such a manner that it is started by the signals coming from the transmitter 28 (29) through the OR gate 84 (94) and is stopped by the next subsequent rising edge of an oscillator pulse. This STOP signal is fed to it under the control of the operation control 80 through an AND gate 85 (95), which serves to suppress the oscillator pulses that are not required through an OR gate 86 (96) and through a delay member 87 (97), the significance of which will be explained in more detail hereinafter.

The time/amplitude converter circuit 88 (98) thus measures, for each transmitter signal and with a high degree of accuracy, the time which is extended by a constant value $\tau$ determined by the delay member 87 (97) and which elapses between the occurrence of the rising edge of this transmitter signal and the next rising edge of a pulse of the free-running oscillator.

Since the counter 79 presents the corresponding approximate value in digitized form, it is expedient to also digitize the analog output signal amplitudes of the time-/amplitude converter circuit 88 (98). This is carried out by means of the analog to digital converter 92 (102). The calculation of the time distance values of interest $\Delta T\alpha\mu$, $\Delta T\beta\nu$, and $\Delta\theta\mu\nu$ is then carried out by the calculator and memory circuit 81.

The operation control 80, which may be constructed as a Johnson counter, for instance, carries out, apart from the abovementioned control of the AND gates 85 and 95, a whole series of further functions which will be explained in conjunction with the description of the remaining components of the time measuring unit 30, insofar as they are of significance.

Of the remaining components of the time measuringg unit 30, the START-STOP control 82 is to be mentioned first. This START-STOP control can give START and STOP signals through the OR gates 84 (94) and 86 (96) respectively to the corresponding inputs of the time/amplitude converter circuit 88 (98). Fundamentally, one can differentiate between two different modes of operation, depending on whether the time/amplitude converter circuit 88 (98) is to be recalibrated with the help of these internally produced START-STOP signals by comparing them with the frequency standard formed by the quartz-controlled oscillator 78, or whether a correcting value is to be produced in order to eliminate propagation delay differences and nonlinearities.

In the first case the START-STOP control 82 receives a command signal from the operation control 80 via the input E1 (E3), in which case it first of all emits a START signal via the line 112 (122), and this signal is exactly in synchronism with the oscillation fed to it from the oscillator via the line (120), e.g. it may coincide for instance exactly with the falling edge of a rectangular pulse emitted by the quartz-controlled oscillator 78. For example, a half period of the oscillator later, i.e. at the next rising edge of a pulse, the control 82 delivers a STOP signal via the line 113 (123), so that it is possible to compare the amplitude value of the output signal of the time/amplitude converter circuit 88 (98), produced in the meantime, with the very accurate and constant oscillation of the quartz oscillator. This comparison may also be carried out with several half or complete periods. Moreover, it is possible to vary the number of oscillator periods used from one calibrating measurement to the next, so that a complete calibration scale results for the output amplitudes of the time/amplitude converter circuit 88 (98).

In the second case the operation control 80 delivers a command signal to the input E2 (E4) of the START-STOP control 82, whereby the latter is caused to emit a START and STOP signal exactly simultaneously on the line 112 (122) and 113 (123) respectively. Since, due to the delay member 87 (97), the STOP signal arrives at the time/amplitude converter circuit 88 (98) with a delay $\tau$, the time/amplitude converter circuit 88 (98) produces an output signal corresponding to this length of time $\tau$. Since the time is selected so as to be somewhat longer than the initial period in which the output signal of the time/amplitude converter increases nonlinearly, the output signal thus obtained represents a correcting value which is suitable for eliminating the influence of this nonlinearity from a measuring or calibrating value obtained just previously. Transit time or propagation delay differences are also covered by this correcting value. Such transit time differences may be present due to parasitic effects between the signal path conveying the START signal to the time/amplitude converter circuit and the corresponding STOP signal path.

Each of these measuring values A was obtained such that the time/amplitude converter circuit 88 (98) was in operation not only during the period to be measured $\Delta t$ but also during the additional period $\tau$. If this period $\tau$ was also added at the end to the particular measuring time in question $\Delta t + \tau$, then, because of the particular selection of $\tau$, each measuring or calibrating value A contains at the output of the time/amplitude converter circuit 88 (98) a portion a, which was obtained during the first $\tau$ time units and which is basically nonlinear, and a portion $\Delta A$ which was subsequently obtained and which is strictly proportional to the period $\Delta t$, which is the period that is of interest here:

$$A = a + \Delta A$$

in which case the size of these two portions is first of all unknown. For this reason, under the control of the operation control 80, the value A, which may be either a time distance value or a calibrating value, is first stored in a first (third) sample and hold circuit 89 (99). Immediately thereafter, the time/amplitude converter circuit 88 (98) is reset to its initial state and a command signal is given from the operation control 80 to the input E2 (E4) of the START-STOP control 82, which simultaneously emits a START and STOP signal via the line 112 (122) and 113 (123) in the manner described above, whereby the time/amplitude converter circuit 88 (98) is caused to produce exactly this fundamentally nonlinear portion a belonging to the above equation, for the duration of the period $\tau$. This portion a is then taken over under the control of the operation control 80 by a second (fourth) sample and hold circuit 90 (100), after which a differential amplifier 91 (101) can calculate in accordance with $$A - a = \Delta A$$

the value $\Delta A$ which is strictly proportional to the period $\Delta t$ that is of interest here, and pass it on to the analog to digital converter 92 (102).

A summary illustration of these operations is again shown in FIGS. 6 and 7 in the form of signal diagrams.

Two pulses emitted by the transmitter 29 are shown along a time scale in the top line of FIG. 6. Since the transmitter 29 is arranged downstream of the sensor 15 sensing mark group α (FIG. 1), these pulses are assumed to be assigned to the m-th and m+1-th mark of this group α.

In the following two lines TRANS 28 (N) and TRANS 28 (M) the pulses n and n+1 from the transmitter 28, which immediately follow the pulses from the transmitter 29 (said transmitter 28 being arranged downstream of the sensor 20 sensing the mark group β (FIG. 1)), are shown in two different periods of time, that is to say, firstly in the period N, in which the point of origin of the angular measurement is fixed and the table of values producing the angular connection between the two mark groups α and β is determined by determining the angular distances $\phi \mu \nu$, and secondly, in the period M in which an angular position $\phi(M)$ of the two members 2 and 3 deviating from the zero position is determined by appropriate measurements.

The top line TRANS 29 (N, M) thus has a double function in FIG. 6 in conjunction with the two lines TRANS 28 (N) and TRANS 28 (M), namely to illustrate the relative position of the pulses deriving from the two transmitters 28 and 29 in two periods of time (and hence, of course, also for different rotations of the mark carrier 5) and in two different angular positions of the two members 2 and 3. Due to this cramping of two completely different periods N (zero point determination) and M (measurement of the new angular position) by means of the one lines TRANS 29 (M, N), the prerequisite results from purely illustrative reasons that the angular speed of the mark carrier in these two periods of time is the same ($\omega(N) = \omega(M)$). It should be noted that this condition need not be fulfilled in the general case, since in the case of the inventive method, other than in the case of the diagram of FIG. 6 shown across a time scale, it is not the time intervals measured in different periods of time but instead the angles in accordance with equations (1), resulting from these time intervals through multiplication with the prevailing angular velocity ω of the mark carrier 5 and hence dependent of ω, which are placed in relationship with one another.

Nevertheless, FIG. 6 has been illustrated in this somewhat restrictive manner (in the above sense) because it shows very clearly that quite different time intervals $\Delta \theta mn$ and $\Delta \theta m+1, n+1$ can result when determining the angular position (M) for "mixed" pairs of marks m, n and m+1, n+1 following each other, because the intervals of the marks m and m+1, on the one hand, and n and n+1, on the other hand, are quite different due to the fact that the mark carrier 5 is manufactured at little expense.

Despite this, two equal values $\phi_1(M)$ and $\phi_2(M)$ result for the angular position to be measured (M), which was assumed to be invariable during the period M, because the stored angular distances $\phi_{mn}$ and $\phi_{m+1, n+1}$ correctly reproduce the irregularities present in the division of the two groups α and β.

In the fourth signal line OSC 78 (M) of FIG. 6 the output pulses occurring in the period M from the free-running quartz-controlled oscillator 78 are shown. The oscillator 78 oscillates with the period Ω.

Below that, FIG. 6 shows the values actually measured for determining the time distances of interest, namely the time distances $\Delta t_1$, $\Delta t_2$, $\Delta t_3$ and $\Delta t_4$ to be measured as precise time values by means of the time-/amplitude converter circuits 88 and 98 (FIG. 5) between the transmitter pulses m, n, m+1 and n+1 and the respective subsequent rising edge of an oscillator pulse, and the corresponding counts $z_1$, $z_2$, $z_3$ and $z_4$ determined with the aid of the counter 79 (FIG. 5).

As can be derived directly from FIG. 6, the "mixed" time distances $\Delta \theta \mu \nu$, which are first of all of interest, can be calculated from the directly measured values in accordance with the following equations:

$$\Delta \theta_{mn} = (z_2 - z_1)\Omega + \Delta t_1 - \Delta t_2$$

$$\Delta \theta_{m+1, n+1} = (z_4 - z_3)\Omega + \Delta t_3 - \Delta t_4$$

It also results directly from FIG. 6 that these "mixed" time distances are linked with the angular values $\phi_1(M)$ and $\phi_2(M)$ by the following relationships:

$$\Delta \theta_{m,n} \omega(M) = \phi_1 U(M) + \phi_{mn}$$

$$\Delta \theta_{m+1, n+1} \omega(M) = \phi_2(M) + \phi_{m+1, n+1}$$

It will be noted that the equations (1) result from these equations after simple transformation.

The time distances $\Delta T\alpha_m$ and $\Delta T\beta_n$, which are also illustrated in FIG. 6, fulfill the following relationships:

$$\Delta T\alpha_m = (z_3 - z_1)\Omega + \Delta t_1 - \Delta t_3$$

$$\Delta T\beta_n = (z_4 - z_2)\Omega + \Delta t_2 - \Delta t_4$$

and may, with the aid of the corresponding, stored calibrating values, be referred to for determining the instantaneous angular velocity:

$$\omega(M) = \frac{\Delta T_{\alpha mE}}{\Delta T_{\alpha m}} \omega E$$

$$\omega(M) = \frac{\Delta T_{\rho nE}}{\Delta T_{\rho n}} \omega E$$

It will be noted that it is in principle sufficient to monitor the angular velocity of the mark carrier by means of only one mark group α or β.

In all events, FIG. 6 clearly shows that all values necessary for determining the instantaneous angular position $\phi(M)$ can be obtained from the precise time values $\Delta t_r$ and the counts $z_r$ (where $r = 1, 2, 3 \ldots$).

Since, as already explained, it is not sufficient that the instantaneous angular velocity $\omega(M)$ of the mark carrier 5 be measured during the determination of the "mixed" time distances $\Delta \theta \mu \nu$, but since it must also be constant during these periods, then for example for the "mixed" time distance $\Delta \theta_{m+1, n+1}$, the angular velocity values determined by measuring the time distances $\Delta T_{\alpha m}$ and $\Delta T_{60 \, m+2}$ (the latter not shown in FIG. 6), which are within the mark groups, are referred to for checking the constancy of this angular velocity.

If it turns out that the angular velocity was constant in the respective periods of time, this value is used for calculating the corresponding angular distance $\phi_r(M)$.

To increase the accuracy of the measurement, it is possible in accordance with the invention to preset the system such that, for instance, 50 or 100 such values are formed from which the arithmetic mean is to be calculated. Depending on whether the angular velocity of the mark carrier varies several times or does not vary at all during the respective period M, these 50 or 100 values are collected more slowly or very quickly as the case may be.

FIG. 6 also shows that the counter 79 continuously counts the pulses of the oscillator 78 (counts $z_r$). Since the counting capacity of the counter 79 is not unlimited, it will start counting from the beginning again as soon as it reaches a maximum counting value. When such resetting occurs the connection to the previous counting values $z_r$ may be lost, so that it is advisable to ensure that the counter 79 is only reset when no interesting time intervals are being measured. If the angular position of the two members 2, 3 varies frequently, it may happen that no suitable period is available for resetting the counter 79. In this case it is advisable to vary the measuring unit 30 illustrated in FIG. 5 in such a manner that a second counter is provided which counts the pulses of the oscillator 78. Each of these two counters would then be assigned to a mark group $\alpha$ and $\beta$ respectively and would, for instance, automatically be set back to zero when the zero mark of the respective group passes the sensor. Then, from the knowledge of the number of marks present in each mark group $\alpha$ and $\beta$, the calculator and memory 81 could always complete the correlation between the counts of both counters which is necessary for forming the "mixed" time intervals.

The way in which the precision time values $\Delta t_r$, shown in FIG. 6, are obtained, will now be explained in the following with reference to FIG. 7.

Referring to FIG. 7, the top line I shows two signals, as they occur, for instance, in the transmitter 28 at the point I, when two marks, for example the n-th and the N+1-th marks of the group $\beta$, pass the sensor 20 one after the other. The zero crossovers of the two signals I represent the ideal marks which were abstracted from the real marks and whose time distance $\Delta T_{\beta n}$ is to be measured.

The second line of FIG. 7 shows the pulses occurring at the output of the OR gate 84. These are first of all the pulses each of which is assigned to the signals I and which are passed from the transmitter 28 through the line 114 to the gate 84 and are passed on further by the latter. The rising sides of these pulses are delayed by s with respect to the crossovers of the signals I, but this delay is—in contrast to the FIG.—extremely small and is of no importance as regards very high accuracy of the measuring result, since it can be taken to be constant for the short period $\Delta T_{\beta,n}$.

For determining $\Delta T_{\beta,n}$ it is therefore possible, without an error, to measure the time intervals of the rising side of the pulses in question at the output of the gate 84.

Since these pulses, which are passed from the transmitter 28 to the gate 84, also pass through the line 111 to the counter 79 and to the operation control 80, the count attained after the first of these two pulses can be read out of the counter 79. In accordance with FIG. 7, in which in the third line from the top, the rectangular pulses of the oscillator 78 are shown, this is the count z+2.

Similarly, the count z+6 is read out of the counter 79 after the second pulse from the transmitter.

Thus the approximate value $$\Delta T_{\beta,nG}=[(z+6)-(z+2)]\Omega=4\Omega$$

is obtained for the time distance $\Delta T_{\beta,n}$, that is of interest here, if $\Omega$ is the length of the oscillator period.

Because of the assumption made here that only a few oscillator pulses occur between the individual pulses from the transmitter, this approximate value is, however, not suitable for giving the time distance $\Delta T_{\beta,n}$ with sufficient accuracy.

For this reason, the time/amplitude converter circuit 88 is started simultaneously with the rising edges of each of the output pulses of the gate 84, each corresponding to a transmitter signal. The output signal of the time/amplitude converter circuit 88 increases, as shown in the bottom line of FIG. 7, at first non-linearly and then, at the latest after the elapse of the period $\tau$, exactly proportional to the time.

The rising edges of the pulses of the oscillator 78, which immediately follow the respective rising edges of the pulses at the output of the gate 84 deriving from the transmitter 28, are indicated in FIG. 7 with the counts z+2 and z+6. These pulses from the oscillator 78 have the time distance $\Delta t_1$ and $\Delta t_3$ from the other pulses deriving from the transmitter 28, and these time distances are of interest as precision time values. These rising edges of the pulses of the oscillator 78 are passed through the gates 85 and 86 to the delay member 87 which, as shown in FIG. 7 in the second line from the bottom, gives a STOP command with the predetermined delay time $\tau$ on to the time/amplitude converter circuit 88.

Thus, at the output of the time/amplitude converter circuit, the amplitudes $A_1$ and $A_3$ are available for the periods $\Delta t_1+\tau$ and $\Delta t_3+\tau$. These amplitudes $A_1$ and $A_3$ are read into the previously reset first sample and hold circuit 89. At the same time, the time/amplitude converter circuit 88 is set back to its initial level.

Upon each of the subsequent falling edges of the oscillator pulses, the START-STOP control 82, which is activated through its input E2 by the operation control 80, simultaneously produces a START and a STOP pulse.

The START pulse appears at the output of the gate 84, practically without delay, as is illustrated in line 2 of FIG. 7, and it causes the renewed rising of the output signal of the time/amplitude converter circuit 88 illustrated in FIG. 7 in the bottom line.

The STOP pulse passes through the delay circuit 87 and appears with a time lag $\tau$ at the output thereof. Hence the time/amplitude converter circuit is again put into operation for the period $\tau$ after each measurement recording, and this leads to the correction values $a_1$ and $a_3$ also shown in FIG. 7 in the bottom line.

These correction values are read into the second sample and hold circuit 90 and subtracted by the differential amplifier 91 from the respective values $A_1$ and $A_3$ contained in the first sample and hold circuit, so that, in accordance with the equations $$A_1-a_1=\Delta A_1$$

$$A_3-a_3=\Delta A_3$$

the amplitude values, which are exactly proportional to the precise time values $\Delta t_1$ and $\Delta t_3$, are read into the analog to digital converter 92.

From this, the calculator and memory 81 can determine the precise time values and calculate the unknown time distance $\Delta T_{\beta,n}$ in accordance with the equation $$\Delta T_{\beta,n}=\Delta T_{\beta,nG}+\Delta t_1-\Delta t_3$$

It will be noted that the time distances $\Delta T_{\beta,n}$, $\Delta T_{\beta,n+1}, \ldots$, which are obtained in this manner, can be added up between subsequent marks of a group without the measuring errors being added up as well. For it follows from the above equation $$\Delta T_{\beta,n} + \Delta T_{\beta,n+1} + \ldots$$
$$= \Delta T_{\beta,nG} + t_1 - \Delta t_3 + \Delta T_{\beta,n+1G} + \Delta t_3 - \Delta t_5 + \ldots$$

Here it can be seen that, with the exception of $\Delta t_1$, all the precise time values $\Delta t_3, \Delta t_5 \ldots$, which have errors, are dropped so that their errors cannot add up.

The START pulses, which are produced internally and which initiate measurement of the correction values $a_1, a_3, \ldots$, need not necessarily be correlated as to time in the manner shown, with the falling edges of the oscillator pulses which follow immediately after the rising edges of the oscillator pulses which end the recording of the values $A_1, A_3$. It is only fundamental that they are produced soon enough after the respective prior measurements so that the correction value $a_1, a_3, \ldots$ obtained from them is a reasonable measure for the substantially nonlinear portion contained in the corresponding value. Moreover, it must be ensured that correction value measurement has been completed before the next measuring value or calibrating value measurement begins.

FIG. 7 further shows a calibrating value measurement taking place in the period $\Delta T_{\beta,n}$ for re-calibrating the time/amplitude converter circuit 88 with the aid of the quartz oscillator 78.

For this purpose, the START-STOP control 82, which is triggered through the input E1 by the operation control 80, first produces a START pulse which is exactly synchronized with the output signal of the oscillator 78. In FIG. 7, this is the third pulse from the left in the line G 84.

The START-STOP control 82, which is exactly synchronized with the oscillator signal, emits a STOP signal through the line 113 which is delayed by a given number of half or complete periods of the oscillator. To simplify the drawing, it is assumed in FIG. 7 that the STOP pulse is produced exactly one quartz half-period after the START pulse. It also passes through the delay member 87 so that the time/amplitude converter circuit is stopped after the period $\Omega/2 + \tau$; the output of the latter provides then a signal with the amplitude $A_E$ which, just like a normal time value, is at first placed in storage in the first sample and hold circuit 89. Subsequently, a correction value $a_E$ is produced in the same manner as described for the time values by activation of the input E2 of the START-STOP circuit 82, so that the differential amplifier 92 can produce the calibration value $\Delta A_E$ which is then also digitized and processed further by the calculator and memory 81.

Since, in general, a sufficiently large number of oscillator pulses occur between subsequent transmitter pulses, it is possible within each period $\Delta T_{\beta\nu}$ to re-calibrate the time/amplitude converter circuit 88 in the manner described hereinbefore.

Corresponding functions also operate for the second time/amplitude converter circuit 98 which is also continuously recalibrated by means of the quartz-controlled oscillator 78 and whose values are also corrected by elimination of the nonlinear rising portion.

Referring finally to FIG. 8, a somewhat modified embodiment of an inventive measuring arrangement is shown. The parts corresponding to parts shown in FIG. 1 are indicated by the same reference numbers raised to a prime. The fundamental difference between this embodiment and the embodiment example of FIG. 1 is that in this case the mark carrier 5' comprises a regular cylinder, on the outer surface of which the marks 10' and 12', which differ as to their light reflecting capacity from the immediately surrounding portions of the mark carrier, are arranged in two groups $\alpha'$ and $\beta'$. These marks also comprise longitudinal stripes which substantially extend perpendicular to the direction of rotation R' of the mark carrier 5', i.e. in this case substantially parallel to the generating line of the cylinder 5'. In this case, too, the two mark groups $\alpha'$ and $\beta'$ are spaced apart and are each sensed by sensing devices 14' and 19' respectively, which, however, in this case function in accordance with the reflected light method.

What is claimed is:

1. A process for measuring the angle which two members enclose, with respect to an axis of rotation about which they are rotatable with respect to each other, comprising the steps of providing a mark carrier, which is attached rotatably to one of said members about the axis of rotation of said two members, said mark carrier having a plurality of marks disposed thereon at a certain distance apart in the direction of rotation, driving said mark carrier for continuous rotation independent of the rotation of said two members; providing a sensor attached to each member for sensing the passage of said marks, said sensors emitting a signal corresponding to each of said marks measuring the time distances between signals assigned to identified marks which come on the one hand from one sensor and on the other hand from the other sensor; and calculating the unknown angle from these time distance values from the instantaneous angular velocity of said mark carrier and from the known angular distances of the marks referred to forming the respective time distance values.

2. A process according to claim 1 including the step wherein each of the respective sensors senses a group of marks which group is geometrically separated from the other group on the mark carrier.

3. The process according to claim 2 including the step of identifying the individual marks within each group by means of asymmetries present in this mark group.

4. The process according to claim 3 wherein a zero mark is identified in each group and the remaining marks of this group are identified by counting the corresponding sensor signals.

5. The process according to claim 4 wherein said zero mark differs as to at least one of length and width from the length and width of the remaining marks.

6. The process according to claim 4 wherein in said measuring step the time distances of all signals following each other during the course of at least one revolution of said mark carrier are measured and the angular distances of the marks thus determined, which are not exactly the same, are processed as asymmetries.

7. The process according to claim 6 wherein in each mark group the zero mark has an angular distance with respect to one of the immediately adjacent marks that significantly differs from the angular distances of all other marks which are immediately adjacent to one another.

8. The process according to any one of claim 1 wherein, before said measuring step a calibrating run is performed wherein the time distances between all signals immediately following one another during a complete revolution of the mark carrier are measured at both sensors, the measuring results thus obtained are multiplied with the angular velocity of the mark carrier, and the calibrating values thus obtained are stored for the angular distances within each mark group, while maintaining their assignment to the identified marks belonging to these signals.

9. The process according to claim 8 wherein the calibrating run comprises at least two complete revolutions of the mark carrier, the time distances of the signals immediately following one another during the first of these two revolutions are initially placed in an intermediate storage both at the one and at the other sensor and are compared with the corresponding time distances measured during at least the second revolution, and, given the coincidence within predetermined tolerance limits of the values compared, the reciprocal value of at least one time distance, which is measured during said rotation, between two signals, which correspond to a complete rotation of the mark carrier and which are caused by one and the same mark at one sensor, is used as a measure for the instantaneous angular velocity of the mark carrier, with which the time distance values in intermediate storage are multiplied and then stored for a longer period as calibrating values.

10. The process according to claim 9 wherein the calibrating run is repeated for continuous re-calibration.

11. The process according to claim 10 wherein a calibrating run is always carried out whenever two members assume a new position of rest after a rotation movement and the new angular position is measured only after this calibrating run.

12. The process according to claim 8 wherein in said measuring step at least one time distance between a signal, produced at one sensor by an identified mark of one group, and a signal produced at the other sensor by an identified mark of the other group is measured and taking into account the instantaneous angular velocity of the mark carrier, the angular distance of at least these two marks belonging to the various groups is determined and stored for a longer period, said angular distance being with respect to the zero point of the angular measurement defined by the instantaneous angular position of the two sensors.

13. The process according to claim 12 wherein from the angular distance of the two marks, each belonging to one of the groups, said angular distance being with respect to the zero point of the angular measurement, and from the calibrating values for the absolute values of the angular distance of the marks, in each case within each group, the angular distances of a plurality of marks, of which one belongs to one group and the other belongs to the other group, are calculated and stored for a longer period, said angular distances being with respect to the zero point of the angular measurement.

14. The process according to claim 8 wherein in said measuring step, upon each rotation of the mark carrier following a calibrating run, the time distances of all immediately following signals are measured at at least one of the sensors and are individually compared with the corresponding stored calibrating value in each case, for determining the instantaneous speed of rotation of the mark carrier.

15. The process according to claim 14 wherein, in order to calculate the instantaneous angular position of the two members, at least the time distance between a signal, produced by an identified mark at one sensor, and the immediately following signal, which occurs at the other sensor and is assigned to an identified mark, is measured, is multiplied with the instantaneous angular velocity, and the angular value thus obtained is added corrected as to sign to the stored angular distance of these two marks, said angular distance being with respect to the zero point of the angular measurement.

16. The process according to claim 15 wherein the time distance between the signal assigned to the identified $\mu$-th mark of the one group and the immediately following signal assigned to an identified mark of the other group is only then used for calculating the instantaneous angular position of the two members if the angular velocity of the mark carrier, which is measured by means of the time distance between the signals of the $(\mu-1)$-th and the $\mu$-th mark of the one group, coincides with the angular velocity of the mark carrier, which is measured by means of the time distance between the signals of the $(\mu+1)$-th and the $(\mu+2)$-th mark of this one group, at least within predetermined tolerance limits.

17. The process according to claim 16 wherein a plurality of such time distances are measured, the corresponding angles determined, and the angle values thus obtained compared with one another.

18. The process according to claim 17 wherein the velocity of a rotation movement occurring between the two members is calculated from a change in the angle values thus obtained.

19. The process according to claim 16 wherein the measurements necessary for determining the instantaneous speed of rotation of the mark carrier are carried out at both sensors, and the two rotational speed values thus obtained are compared with each other, and the velocity of a rotation movement occurring between the two members is calculated from variations determined by such comparison.

20. The process according to claim 16 wherein the pulses of a free-running, quartz-controlled oscillator are counted for the different time distance measurements, and, upon the occurrence of a signal at one or other of the sensors, the count attained after the rising edge of the next oscillator pulse is read out and processed further.

21. The process according to claim 20 wherein the position as to time of the sensor signals is determined within the respective period of oscillation of the oscillator by assigning a time/amplitude converter circuit to the respective sensor, said converter being started by the sensor signals and stopped by the rising edge of the next oscillator pulse.

22. The process according to claim 21 including the stop of recalibrating the time/amplitude converter circuit over and again in that it is started by an edge of an oscillator pulse and stopped by a subsequent edge of an oscillator pulse, and the time value of the time/amplitude converter circuit thus obtained is compared with the period which elapses between these two edges of oscillator pulses.

23. The process according to claim 22 wherein the stopping of the time/amplitude converter circuit by the rising edge of the appropriate oscillator pulse occurs with a predetermined delay for each time distance measurement and for each calibrating measurement, and the time/amplitude converter circuit is started after each of these measurements by a START signal produced within the circuitry and is again stopped by a STOP signal produced simultaneously with said START signal and also subject to said predetermined delay, and the correction value thus obtained is subtracted from the previously obtained time measurement or calibration measurement value.

24. The process according to claim 8 wherein, in said measuring step, ideal marks are abstracted by each of the sensors from the real marks disposed on the mark carrier, and the time distances of said ideal marks are measured.

25. The process according to claim 24 wherein the crossover of an electric signal through a predetermined constant voltage level serves as an ideal mark, said electric signal being derived from the signal emitted by the sensor when a mark passes it.

26. The process according to claim 25 wherein said sensors comprise a differential photo receiver having at least one subtracting member connected downstream thereof and the zero-crossover of the output signal produced by the subtracting member when a mark passes the differential photo receiver serves as an ideal mark.

27. The process according to claim 26 including producing a rectangular pulse for each output signal emitted by the subtracting member when a mark passes the differential photo receiver, at least one edge of said rectangular pulse being a fixed time interval away from the zero-crossover of the output signal, and the time distance of these edges are measured and processed further.

28. Apparatus for measuring the angle which two members enclose with respect to an axis of rotation about which they are rotatable with respect to each other, comprising a rotating mark carrier having marks disposed thereon at a certain distance apart in the direction of rotation, said mark carrier being attached to one of the two members so as to rotate about their mutual axis and of being driven by a drive means for rotating said mark carrier continuously independent of the rotation movement of the two members, a pair of sensors, one of said sensors being attached to the same member as the mark carrier and the other being attached to the other member, said sensors emitting a signal corresponding to each of said marks, and a measuring and evaluating circuit comprising an identification circuit which identifies the marks belonging to the signals emitted by the sensors, a time measuring unit which measures the time distances of the signals emitted by the sensors and a calculation and storage circuit which, after receiving a corresponding command signal, calculates and stores the angular distances, with respect to a zero point of the angular measurement, between the marks from the time distance values for signals assigned to identified marks and coming from the various sensors, from stored calibrating values for the absolute angular distances of identified marks, and from the instantaneous angular velocity of the mark carrier and which, upon subsequent rotations of the mark carrier, calculates the instantaneous angle between the two members from the time distance values for signals assigned to identified marks and coming from the various sensors, and from the stored angular distances of these marks, said angular distances being with respect to the zero point of the angular measurement, and from the instantaneous angular velocity of the mark carrier.

29. The apparatus according to claim 28 wherein the measuring and evaluating circuit comprises, an intermediate memory which stores the time distance measurements for the signal sequences produced by the sensors during each rotation of the mark carrier, a comparison circuit which compares the time distance measurements newly obtained for each signal sequence upon a subsequent rotation of the mark carrier with the corresponding time distance measurements in intermediate storage, and a calculation and storage circuit which calculates calibrating values for the absolute angular distances of identified marks and the instantaneous angular velocity of the mark carrier, dependent on the comparison result, and which stores these calibrating values.

30. The apparatus according to claim 29 wherein each sensor consists of a differential photo diode to which is connected downstream a transmitter forming its output signals, said transmitter comprising at least one subtracting member connected to the two outputs of the differential photo diode and a comparator which compares the output signal of the subtracting member with a predetermined constant voltage level.

31. The apparatus according to claim 30 wherein two groups of marks which are geometrically separated, are arranged on the mark carrier, and the first group is sensed by the first sensor and the other group is sensed by the second sensor.

32. The apparatus according to claim 31 wherein the mark carrier comprises two flat discs which are arranged on a mutual shaft and axially spaced a distance apart and one of which carries the mark group $\alpha$ and the other carries the mark group $\beta$.

33. The apparatus according to claim 31 wherein the mark carrier is a regularly cylindrical member on whose generating surface the two groups of marks are arranged and spaced an axial distance apart.

34. The apparatus according to claim 33 wherein the marks of the respective groups are stripes which differ with respect to their optical properties from the adjacent portions of the mark carrier and which comprises stripe running substantially perpendicular to the direction of rotation of the mark carrier.

35. The apparatus according to claim 34 wherein the width of each mark stripe is larger than the width of the separating ridge of the differential photo diode and smaller than the width of the differential photo diode.

36. The apparatus according to claim 34 wherein the marks differ with respect to their light transmitting capacity from the portions of the mark carrier surrounding them, and a light source illuminating the sensor is arranged on the side of the mark carrier opposite the sensor.

37. The apparatus according to claim 34 wherein the marks differ with respect to their light reflecting capacity from the portions of the mark carrier surrounding them, and a light source illuminating the sensor is arranged on the same side of the mark carrier as the sensor.

38. An apparatus according to claim 37 wherein the light from the light source is vertically directed to the surface of the mark carrier, and the light reflected by the mark carrier in the path of the impinging light beam is diverted to the differential photo diode by means of a beam splitter.

39. The apparatus according to any one of claim 28, wherein the time measuring unit comprises a quartzcontrolled oscillator, a counter counting the oscillator periods, and two time/amplitude converter circuits with analog to digital converters connected downstream thereof, said time/amplitude converter circuits to be triggered by signals from their respective transmitters and stopped by the signals emitted by the quartz oscillator.

40. The apparatus according to claim 39 wherein a delay member is connected upstream of the STOP input of each time/amplitude converter circuit, the time measuring unit comprises a circuit for producing and simultaneously emitting a START and a STOP signal for each of the time/amplitude converter circuits and two sample and hold circuits are connected in parallel downstream of the analog output of each of the time-/amplitude converter circuits, one of said sample and hold circuits to be triggered for collecting and storing time measurements emitted by the corresponding time-/amplitude converter circuits and the other to be triggered for collecting and storing the respectively corresponding correction values emitted by the corresponding time/amplitude converter circuit due to the START and STOP signals produced by the circuit.

41. The apparatus according to claim 40 wherein the output of one sample and hold circuit is connected to the positive input of a corresponding differential amplifier and the output of the other sample and hold circuit is connected to the negative input of the differential amplifier, whose output signal can be fed to the corresponding analog to digital converter.

42. The apparatus according to claim 41 wherein only one single group of marks is arranged on the mark carrier, and said marks are sensed by both sensors.

43. The apparatus according to claim 28 wherein the light source is arranged in the immediate vicinity of the mark carrier.

44. The apparatus according to claim 28 wherein a fibre-optical light guide is provided which guides the light from the light source to the immediate vicinity of the mark crrier.

45. The apparatus according to claim 28 wherein each light source is a light emitting diode.

46. Apparatus for measuring an angle formed between a first member and a second member rotatable about a common axis comprising:
a mark carrier disposed for rotation about said axis;
means for rotating said mark carrier;
means attached to said first member for sensing the position of marks of said carrier relative to said first member;
means attached to said second member for sensing the position of marks of said carrier relative to said second member;
one of the marks viewed by said first sensor being configured differently than the other ones of said marks to serve as a first reference mark;
one of the marks viewed by said second sensor being configured differently than the other ones of said marks to serve as a second reference mark; and
means coupled to said first and said second sensors for processing signals produced by said sensors in response to sensings of said marks to determine the relative angular position between said first and said second members; said processing means including timing means for timing the occurrences of said sensor signals, and means coupled to said timing means for calculating the speed of rotation of said carrier; said processing means further comprising means responsive to said first and said second reference marks and to said speed of rotation for computing the angular position between said first and said second members based on the patterns of marks sensed by respective ones of said sensors during a complete revolution of said carrier, whereby the angular measurement is independent of deviations in the shapes and/or sizes of substantially equal marks.

* * * * *